US008185113B2

(12) United States Patent
Suh et al.

(10) Patent No.: US 8,185,113 B2
(45) Date of Patent: May 22, 2012

(54) HANDOVER APPARATUS AND HANDOVER METHOD IN WIRELESS COMMUNICATION SYSTEM

(75) Inventors: Young-Joo Suh, Pohang (KR); Woo-Jae Kim, Pohang (KR); Yong-Sung Kim, Pohang (KR); Wan-Seon Lim, Pohang (KR)

(73) Assignee: Postech Academy-Industry Foundation, Kyungsangbuk-do (KR)

( * ) Notice: Subject to any disclaimer, the term of this patent is extended or adjusted under 35 U.S.C. 154(b) by 1051 days.

(21) Appl. No.: 12/115,577

(22) Filed: May 6, 2008

(65) Prior Publication Data

US 2008/0280613 A1 Nov. 13, 2008

(30) Foreign Application Priority Data

May 7, 2007 (KR) ........................ 10-2007-0044190

(51) Int. Cl.
*H04Q 7/20* (2006.01)
(52) U.S. Cl. ........................ 455/436; 370/331
(58) Field of Classification Search .................... 455/436
See application file for complete search history.

(56) References Cited

U.S. PATENT DOCUMENTS

| 2006/0140150 A1* | 6/2006 | Olvera-Hernandez et al. ............................ 370/331 |
| 2006/0187881 A1* | 8/2006 | Kwak et al. .................... 370/331 |
| 2006/0268782 A1* | 11/2006 | Kwak et al. .................... 370/331 |
| 2007/0189218 A1* | 8/2007 | Oba et al. ........................ 370/331 |
| 2008/0207206 A1* | 8/2008 | Taniuchi et al. ............... 455/436 |

FOREIGN PATENT DOCUMENTS

WO 2007/038272 A 4/2007

OTHER PUBLICATIONS

Mussabbir, Qazi Bouland, et al., "Optimized FMIPv6 Handover using IEEE802.21 MIH Services," MOBIARCH '06, ACM, San Francisco, CA, USA, Dec. 1, 2006, pp. 43-48.
An, Yoon Young, et al., "Reduction of Handover Latency Using MIH Services in MIPv6," International Conference on Advanced Information Networking and Applications (AINA '06), Vienna, Austria, Apr. 18-20, 2006, vol. 2, Apr. 18, 2006, pp. 229-234.
Koodli, R. et al., "Fast Handovers for Mobile IPv6," rfc4068.txt, IETF Standard, Internet Engineering Task Force, IETF, CH, Jul. 1, 2005.

* cited by examiner

*Primary Examiner* — Dwayne Bost
*Assistant Examiner* — Joseph Dean, Jr.
(74) *Attorney, Agent, or Firm* — Perman & Green, LLP

(57) ABSTRACT

A method and apparatus for performing handover of a terminal in a wireless communication system, the method including obtaining information on neighboring networks from a media independent handover (MIH) server by using a MIH layer if a state of a link connected to a serving network is changed; transmitting a handover initiation request message to the MIH layer of the serving network through the MIH layer; checking handover support information and tunnel state information of the neighboring networks which are received from the MIH layer of the serving network; determining a target network to which handover is performed and performing layer-2 (L2) handover with the target network, by using the handover support information; and performing layer-3 (L3) handover with the target network by using the tunnel state information.

39 Claims, 10 Drawing Sheets

HANDOVER APPARATUS AND HANDOVER METHOD IN WIRELESS COMMUNICATION SYSTEM

CROSS-REFERENCE TO RELATED PATENT APPLICATION

This application claims the benefit of Korean Patent Application No. 10-2007-0044190, filed on May 7, 2007, in the Korean Intellectual Property Office, the disclosure of which is incorporated herein in its entirety by reference.

BACKGROUND

1. Field

The disclosed embodiments relate to a handover apparatus and a handover method in a wireless communication system, and more particularly, to a method and apparatus for performing fast handover based on media independent handover (MIH) in a wireless communication system.

2. Description of the Related Art

A wireless communication system supports mobility of a terminal by using a handover technology. The handover technology is divided into a media access control (MAC) layer handover technology and a network layer handover technology. The MAC layer handover technology is used when a terminal accesses a network in order to perform handover in a wireless local area network (WLAN) according to Institute of Electrical and Electronics Engineers (IEEE) 802.11 standards or in a wireless metropolitan area network (WMAN) according to IEEE 802.16 standards. If the WLAN provides services to a terminal and the terminal performs MAC layer handover, the terminal obtains information on a serving access point (AP) and neighboring APs by performing a probing process. After the information on the neighboring APs is obtained, the terminal selects an optimal AP by comparing intensities of signals which are received from the neighboring APs, to each other. Then, the terminal and the selected AP mutually perform authentication and association and thus the MAC layer handover is completely performed.

Technologies such as a mobile Internet protocol (IP) technology for performing network layer handover in the wireless communication system have been standardized. Furthermore, a fast handover technology is being researched in order to improve the performance of the mobile IP technology in the wireless communication system. For example, fast handover is performed in the wireless communication system as described below in FIG. 1.

FIG. 1 is a diagram for describing a conventional method of performing fast handover in a wireless communication system. Here, the fast handover may be performed after a layer-2 (L2) (MAC layer) selects a target network 104 to which the fast handover is performed, from among neighboring networks of a terminal 100.

Referring to FIG. 1, if a trigger is created in the L2, the terminal 100 in the wireless communication system determines that handover is required and transmits a target network information request message such as a Router Solicitation for Proxy (RtSolPr) message to a serving network 102 in operation 111. In this case, the trigger includes L2 information on the target network 104 of the terminal 100 and the terminal 100 transmits the target network information request message by including the L2 information into the target network information request message.

When the target network information request message is received, the serving network 102 transmits a target network information response message including information on the target network 104, such as a proxy router advertisement (PrRtAdv) message, to the terminal 100 in operation 113.

The terminal 100 checks the information on the target network 104 from the target network information response message that is received from the serving network 102. Then, the terminal 100 creates a care-of address corresponding to the target network 104 by using the information on the target network 104.

After the care-of address is created, the terminal 100 transmits a fast binding update (FBU) message including the care-of address to the serving network 102 in operation 115.

The serving network 102 checks the care-of address from the FBU message and then transmits a handover initiation (HI) message including the care-of address, to the target network 104 in operation 117.

The target network 104 checks the care-of address from the HI message. Then, the target network 104 performs duplicate address detection (DAD) so as to determine whether the care-of address is usable in operation 119. That is, the target network 104 determines whether the care-of address is not duplicated with an address or another care-of address which is used by another terminal in the target network 104. If the care-of address is usable, that is, if the care-of address is not duplicated with another address, the target network 104 transmits a care-of address authentication message such as a handover acknowledge (HAck) message to the serving network 102 in operation 121. Meanwhile, if the care-of address is not usable, that is, if the care of address is duplicated with another address, the target network 104 creates a new care-of address and transmits a message including the new care-of address, such as the HAck message, to the serving network 102 in operation 121.

In this case, the target network 104 forms a tunnel which corresponds to the care-of address and is connected to the serving network 102.

The serving network 102 checks the HAck message that is received from the target network 104 and transmits a fast binding acknowledgement FBAck message including information on the HAck message, to the terminal 100 in operation 123. Then, the serving network 102 forwards data to be forwarded to the terminal 100, to the target network 104 through the tunnel in operation 125.

When the FBack message is received, the terminal 100 performs L2 (MAC layer) handover in operation 127.

Then, the terminal 100 transmits a fast neighbor advertisement (FNA) message to the target network 104 in order to perform layer-3 (L3) (network layer) handover in operation 129.

When the FNA message is received, the target network 104 forwards the data which is received from the serving network 102 and is temporarily stored, to the terminal 100 in operation 131.

As described above with reference to FIG. 1, in a wireless communication system, MAC layer handover and network layer handover have to be integrally used in order to guarantee mobility of a terminal. In this case, if fast handover is performed in the wireless communication system, a trigger that is created in order to perform handover in an L2 may not be clearly determined. In order to solve such problem, an MIH technology is standardized according to IEEE 802.21 standards.

In this case, the wireless communication system supports handover of the terminal by synchronizing the MAC layer handover and the network layer handover which are independently performed by using the MIH technology. Furthermore, the wireless communication system defines horizontal handover only. Thus, the wireless communication system may not sufficiently use functions provided by the MIH technology.

SUMMARY

The disclosed embodiments provide a method and apparatus for performing handover based on media independent handover (MIH) in a wireless communication system.

The disclosed embodiments also provide a method and apparatus for performing fast handover based on MIH in a wireless communication system.

The disclosed embodiments also provide a method and apparatus for performing vertical fast handover based on MIH in a wireless communication system.

According to an aspect of the disclosed embodiments, there is provided a method of performing handover of a terminal in a wireless communication system, the method including obtaining information on neighboring networks from a media independent handover (MIH) server by using a MIH layer if a state of a link connected to a serving network is changed; transmitting a handover initiation request message to the MIH layer of the serving network through the MIH layer; checking handover support information and tunnel state information of the neighboring networks which are received from the MIH layer of the serving network; determining a target network to which handover is performed and performing layer-2 (L2) handover with the target network, by using the handover support information; and performing layer-3 (L3) handover with the target network by using the tunnel state information.

According to another aspect of the disclosed embodiments, there is provided a method of supporting handover of a terminal by a serving network in a wireless communication system, the method including checking handover request information and tunnel setup information from a handover initiation message that is received from the terminal through a media independent handover (MIH) layer; forming tunnels with available networks to which the handover of the terminal is performed through the MIH layer by using the tunnel setup information; transmitting tunnel formation information to the terminal through the MIH layer; checking target network information from a tunnel activation request signal that is received from the terminal through the MIH layer; and forwarding data to be forwarded to the terminal, to a target network by activating a tunnel connected to the target network.

According to another aspect of the disclosed embodiments, there is provided a method of supporting handover of a terminal by a target network in a wireless communication system, the method including checking handover request information and tunnel setup information of the terminal which are received from a predetermined network through a media independent handover (MIH) layer; forming a tunnel connected to the predetermined network by using the handover request information and the tunnel setup information; and activating the tunnel and receiving data from the predetermined network if a tunnel activation request signal is received from the predetermined network through the MIH layer.

According to another aspect of the disclosed embodiments, there is provided a method of supporting handover of a terminal by a serving network in a wireless communication system, the method including checking handover request information and tunnel setup information from a handover initiation message that is received from the terminal through a media independent handover (MIH) layer; forming tunnels with available networks to which the handover of the terminal is performed through the MIH layer by using the tunnel setup information; transmitting tunnel formation information to the terminal through the MIH layer; activating a tunnel connected to a target network if a tunnel activation request signal for performing the handover of the terminal is received from the target network through the MIH layer; and forwarding data to be forwarded to the terminal, to the target network through the tunnel.

According to another aspect of the disclosed embodiments, there is provided a method of supporting handover of a terminal by a target network in a wireless communication system, the method including checking handover request information and tunnel setup information of the terminal which are received from a predetermined network through a media independent handover (MIH) layer; forming a tunnel connected to the predetermined network by using the handover request information and the tunnel setup information; transmitting a tunnel activation request signal to the predetermined network if the tunnel activation request signal is received from the terminal through the MIH layer; and activating the tunnel and receiving data from the predetermined network.

According to another aspect of the disclosed embodiments, there is provided a wireless communication system for supporting handover, the wireless communication system including a terminal; a serving network; and a target network, wherein the terminal controls tunnel setup between the serving network and available networks through a media independent handover (MIH) layer, activates a tunnel between the serving network and the target network to which the handover is performed from among the available networks, and performs the handover to the target network, wherein the serving network sets up tunnels connected to the available networks in accordance with a signal that is received from the terminal through the MIH layer, activates a tunnel connected to the target network, and forwards data to be forwarded to the terminal, to the target network through the tunnel, and wherein the target network sets up the tunnel connected to the serving network in accordance with a signal that is received from the serving network through the MIH layer, and forwards the data that is received from the serving network through the tunnel, to the terminal after the handover is performed.

According to another aspect of the disclosed embodiments, there is provided a terminal in a wireless communication system, the terminal including a media independent handover (MIH) module for obtaining information on neighboring networks from a MIH server in order to perform handover, and transmits and receives signals for performing the handover from the serving network to the target network; and a handover control module for controlling the handover by using signals which are received from the MIH module.

BRIEF DESCRIPTION OF THE DRAWINGS

The above and other features and advantages of the disclosed embodiments will become more apparent by describing in detail exemplary embodiments thereof with reference to the attached drawings in which.

DETAILED DESCRIPTION OF THE DISCLOSED EMBODIMENTS

Hereinafter, the aspects of the disclosed embodiments will be described in detail by explaining embodiments of the invention with reference to the attached drawings. In the following description of the present invention, a detailed description of known functions and configurations incorporated herein will be omitted when it may make the subject matter of the present invention unclear.

A technology for performing handover based on media independent handover (MIH) in a wireless communication system will now be described. In more detail, a technology for supporting fast handover in the wireless communication system by expending the MIH, and thereby supporting the fast handover of a terminal regardless of a mobility protocol of a network layer will now be described.

In the following description of the disclosed embodiments, vertical handover in the wireless communication system between a wireless local area network (WLAN) according to Institute of Electrical and Electronics Engineers (IEEE) 802.11 standards and a wireless metropolitan area network (WMAN) according to IEEE 802.16 standards will be exemplarily described. In this case, the wireless communication system may be applied to horizontal handover as well as the vertical handover between different networks.

Furthermore, in the following description of the disclosed embodiments, handover using an MIH technology defined by MIH standards draft 2.0 in the wireless communication system will be described. However, the aspects of the disclosed embodiments may also be applied to the MIH technology defined by MIH standards draft 3.0. In addition, the aspects of the disclosed embodiments may also be applied to MIH standards to be modified in the future.

Figure 2:
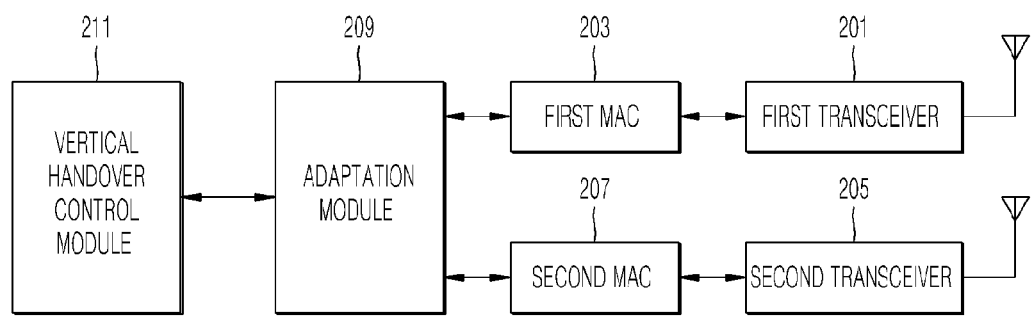
FIG. 2 is a block diagram of a terminal in a wireless communication system, according to an embodiment.

A terminal for performing vertical handover based on MIH in a wireless communication system is configured as illustrated in FIG. 2.

FIG. 2 is a block diagram of a terminal in a wireless communication system, according to an embodiment.

Referring to FIG. 2, the terminal according to the current embodiment includes a first transceiver 201, a first media access control (MAC) layer 203, a second transceiver 205, a second MAC layer 207, an adaptation module 209, and a vertical handover control module 211.

The first transceiver 201 transmits and receives signals to and from a WLAN through an antenna. The first MAC layer 203 processes signals which are received from the first transceiver 201 and provides the processed signals to the adaptation module 209. Also, the first MAC layer 203 processes signals which are received from the adaptation module 209 and provides the processed signals to the first transceiver 201.

The second transceiver 205 transmits and receives signals to and from a WMAN through an antenna. The second MAC layer 207 processes signals which are received from the second transceiver 205 and provides the processed signals to the adaptation module 209. Also, the second MAC layer 207 processes signals which are received from the adaptation module 209 and provides the processed signals to the second transceiver 205.

The adaptation module 209 converts signals which are received from the first and second MAC modules 203 and 207 and are separately defined by the WLAN and WMAN, and transmits the converted signals to the vertical handover control module 211 so that the vertical handover control module 211 may process the converted signals regardless of networks. Also, the adaptation module 209 separately converts signals which are received from the vertical handover control module 211 in accordance with of the WLAN and WMAN, and separately transmits the converted signals to the first and second MAC modules 203 and 207 respectively corresponding to the WLAN and WMAN. Here, the adaptation module 209 is an MIH module performing MIH functions.

Furthermore, the adaptation module 209 obtains information on neighboring networks from an MIH server. Also, when the handover is performed on the terminal, the adaptation module 209 transmits and receives messages related to the handover of the terminal to and from adaptation modules of neighboring networks as well as a serving network.

The vertical handover control module 211 controls vertical handover of the terminal in accordance with signals which are received from the adaptation module 209. That is, the vertical handover control module 211 controls the vertical handover of the terminal by using the information on the neighboring networks and event information which are received from the adaptation module 209. Here, the information on the neighboring networks includes the information on the neighboring networks which is received by the adaptation module 209 from the MIH server and handover support information of the neighboring networks which is received by the adaptation module 209 from the serving network.

A method of performing vertical handover based on MIH in a wireless communication system will now be described.

Initially, a method of performing handover of a terminal that receives services, from a WMAN network to a WLAN will be described. Hereinafter, it is assumed that the WMAN is a serving network and the WLAN is a target network.

Figure 3:
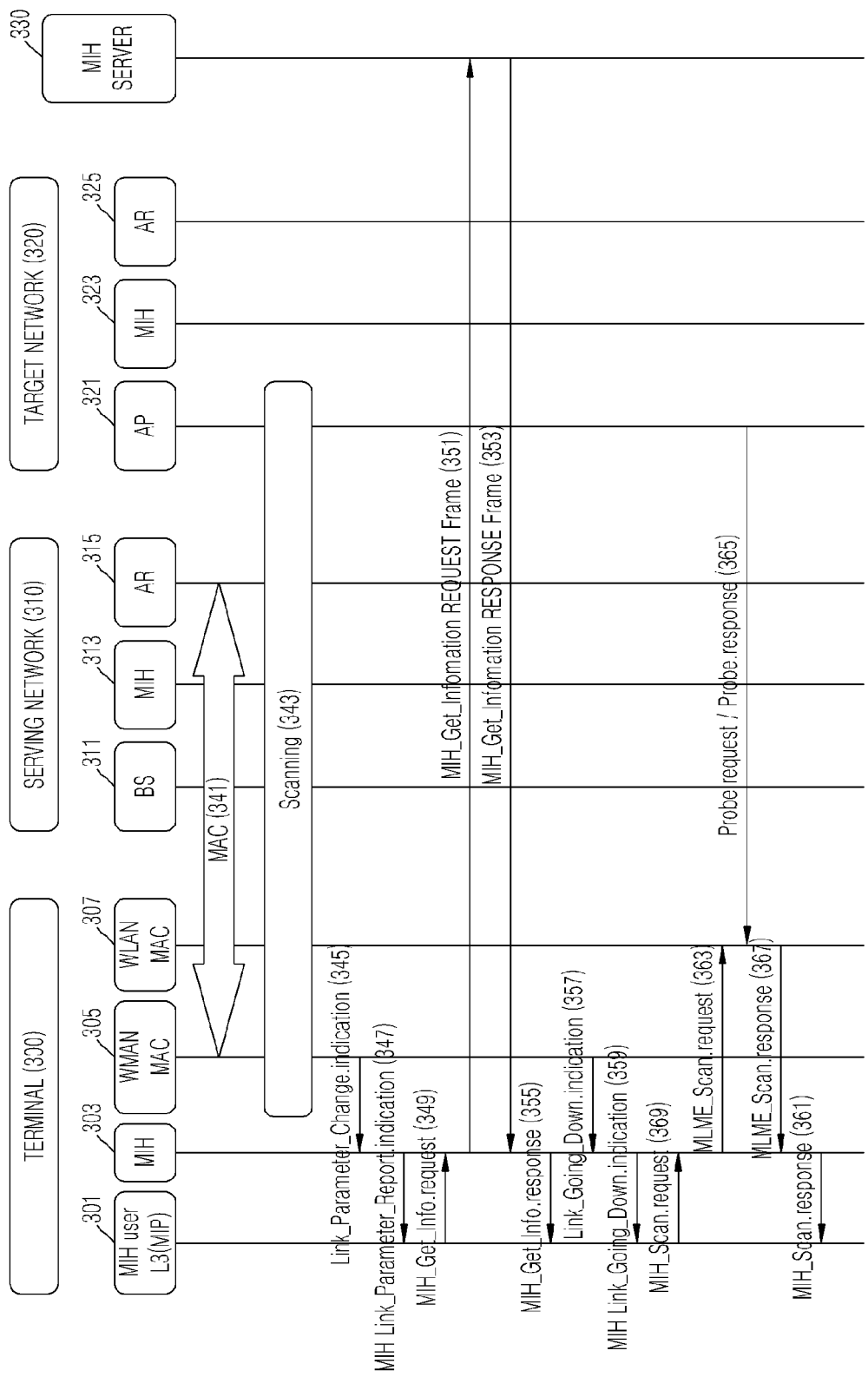
FIG. 3 is a diagram for describing a method of selecting a target network based on media independent handover (MIH) in a wireless communication system, according to an embodiment.

FIG. 3 is a diagram for describing a method of selecting a target network 320 based on MIH in a wireless communication system, according to an embodiment.

Referring to FIG. 3, a terminal 300 communicates with an access router (AR) 315 that is a network layer of a serving network 310, by using a WMAN MAC layer 305 in operation 341. In this case, the terminal 300 determines whether handover is required, by performing a periodical scanning process in operation 343.

If a state of a link through which communication is currently performed is changed, the WMAN MAC layer 305 notifies an MIH layer 303 that the state of the link is changed, by using a link variable change event Link_Parameters_Change.indication that is defined by an MIH technology, in operation 345.

When the link variable change event Link_Parameters_Change.indication is created, the MIH layer 303 notifies an MIH user 301 that the state of the link connected to the serving network 310 is changed, by using a link variable report event MIH Link_Parameter_Report.indication in operation 347. In this case, the MIH layer 303 transmits link state change information and information on how the state of the link is changed, to the MIH user 301.

The MIH user 301 determines whether the handover of the terminal 300 is required, by using the link state change information that is received from the MIH layer 303 through the link variable report event MIH Link_Parameter_Report.indication. If it is determined that the handover of the terminal 300 is required, the MIH user 301 transmits an MIH neighboring network information request message MIH_Get_Info.request to the MIH layer 303 in operation 349.

When the MIH neighboring network information request message MIH_Get_Info.request is received, the MIH layer 303 transmits a neighboring network information request message MIH_Get_Information REQUEST Frame to an MIH server 330 in operation 351.

When the neighboring network information request message MIH_Get_Information REQUEST Frame is received, the MIH server 330 transmits a neighboring network information response message MIH_Get_Information RESPONSE Frame including information on neighboring networks of the terminal 300, to the MIH layer 303 in operation 353. Here, the information on the neighboring networks includes network address information of the neighboring networks. Also, the information on the neighboring networks may include any information to be used when the terminal 300 determines the target network 320. Thus, the MIH server 330 has to maintain and manage the information on the neighboring networks. In the following description of the disclosed embodiments, only vertical handover of a terminal will be described and thus a method of managing information on neighboring networks will not be mentioned.

The MIH layer 303 checks the information on the neighboring networks of the terminal 300 from the neighboring network information response message MIH_Get_Information RESPONSE Frame that is received from the MIH server 330. Then, the MIH layer 303 provides an MIH neighboring network information response message MIH_Get_Info.response including the information on the neighboring networks, to the MIH user 301 in operation 355. In this case, the MIH user 301 creates new network addresses of the neighboring networks by using network addresses of the neighboring networks which are included in the MIH neighboring network information response message MIH_Get_Info.response. For example, the MIH user 301 creates new care-of addresses of the neighboring networks.

Then, the WMAN MAC layer 305 checks the state of the link connected to the serving network 310 by performing the periodical scanning process. If it is determined that the link connected to the serving network 310 is to be going down, the WMAN MAC layer 305 transmits the link state change information to the MIH layer 303 by using a link going down (LGD) event Link_Going_Down.indication in operation 357.

When the LGD event Link_Going_Down.indication is created, the MIH layer 303 notifies the MIH user 301 of the link state change information of the link connected to the serving network 310 by using an MIH LGD event MIH Link_Going_Down.indication in operation 359.

If it is determined that the link connected to the serving network 310 is to be going down by using the link state change information that is received from the MIH layer 303 through the MIH LGD event MIH Link_Going_Down.indication, the MIH user 301 transmits a MIH scan request message MIH_Scan.request to the MIH layer 303 in operation 361. That is, the MIH user 301 transmits the MIH scan request message MIH_Scan.request for activating a WLAN MAC layer 307, to the MIH layer 303 in order to find the target network 320 to which the handover is performed.

When the MIH scan request message MIH_Scan.request is received, the MIH layer 303 transmits a MAC sublayer management entity (MLME) scan request message MLME_Scan.request to the WLAN MAC layer 307 in operation 363. That is, when the terminal 300 communicates with the serving network 310, the WLAN MAC layer 307 is inactivated. Thus, the MIH layer 303 transmits the MLME scan request message MLME_Scan.request to the WLAN MAC layer 307 in order to activate the WLAN MAC layer 307.

When the MLME scan request message MLME_Scan.request is received, the WLAN MAC layer 307 obtains information on neighboring WLANs of the terminal 300 by performing a probing process, in accordance with a method defined by a WLAN standard, in operation 365. Then, the WLAN MAC layer 307 transmits the information on the neighboring WLANs to the MIH layer 303 by using an MLME scan response message MLME_Scan.response in operation 367.

The MIH layer 303 checks the information on the neighboring WLANs from the MLME scan response message MLME_Scan.response that is received from the WLAN MAC layer 307. Then, the MIH layer 303 transmits an MIH scan response message MIH_Scan.response including the information on the neighboring WLANs to the MIH user 301 in operation 369.

A method of forming tunnels between a serving network and available networks in a wireless communication system after the method described above with reference to FIG. 3 is performed will now be described.

Figure 4:
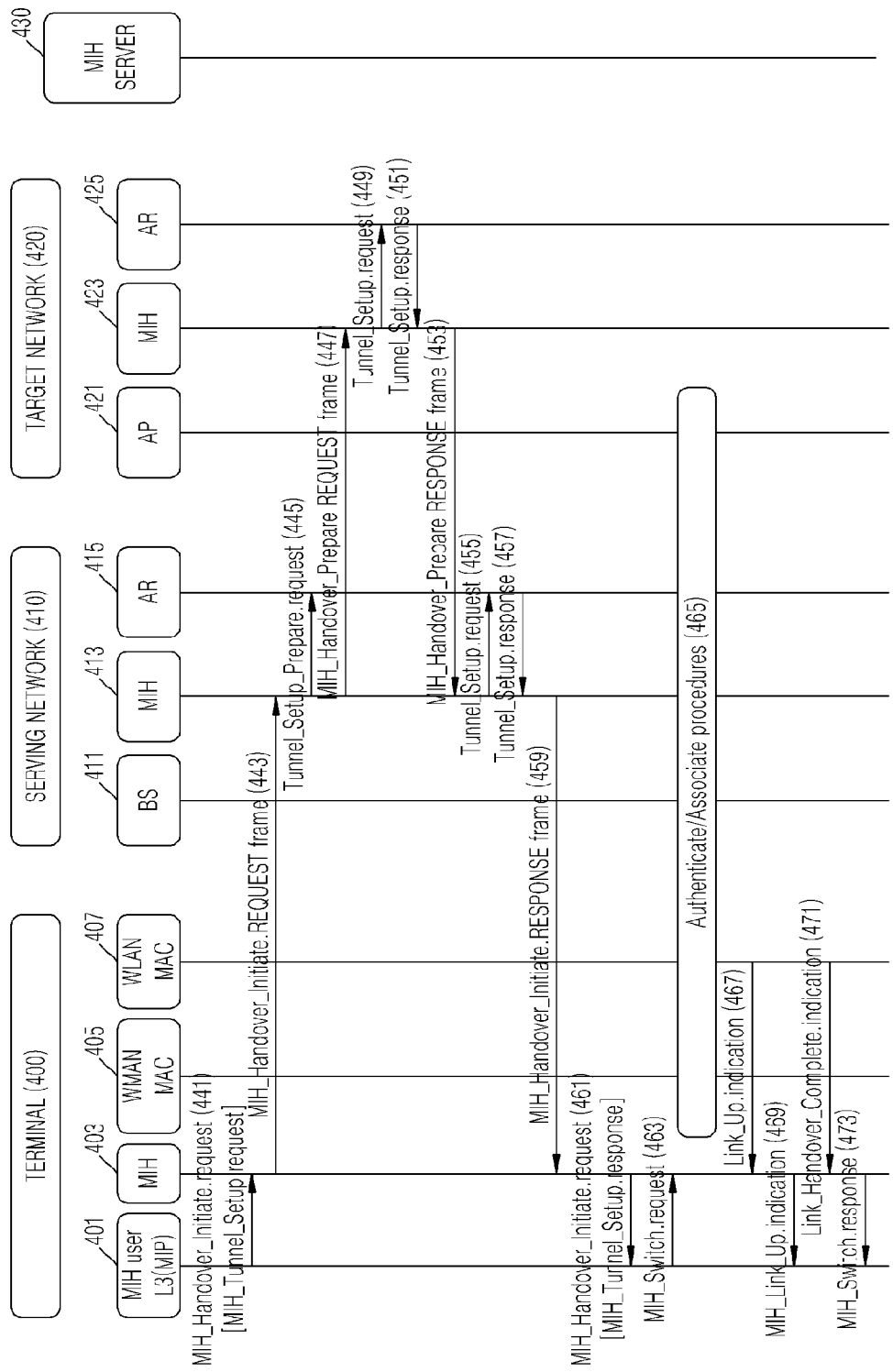
FIG. 4 is a diagram for describing a method of forming a tunnel based on MIH in a wireless communication system, according to an embodiment.

FIG. 4 is a diagram for describing a method of forming a tunnel based on MIH in a wireless communication system, according to an embodiment.

Referring to FIG. 4, an MIH user 401 of a terminal 400 obtains information on neighboring WLANs by performing a probing process, as described above with reference to FIG. 3. Then, the MIH user 401 transmits a MIH handover initiation request message MIH_Handover_initiate.request to a MIH layer 403 in order to check whether the neighboring WLANs may support handover of the terminal 400 in operation 441. Hereinafter, the neighboring WLANs are referred to as available networks.

In this case, the MIH user 401 prepares to form tunnels between a serving network 410 and the available networks. For example, in order to form the tunnels between the serving network 410 and the available networks, start and end points of the serving network 410 and the available networks are necessary. Thus, the MIH user 401 includes an MIH tunnel setup request message MIH_Tunnel_setup.request including care-of addresses of the available networks into the MIH handover initiation request message MIH_Handover_initiate.request. In this case, the MIH tunnel setup request message MIH_Tunnel_setup.request includes a care-of address of the terminal 400 which is used in the serving network 410 and care-of addresses which are created by the terminal 400 in order to be used in the available networks.

When the MIH handover initiation request message MIH_Handover_initiate.request is received, the MIH layer 403 transmits a handover initiation request message MIH_Handover_Initiate REQUEST frame to an MIH layer 413 of the serving network 410 in operation 443. In this case, the handover initiation request message MIH_Handover_Initiate REQUEST frame includes a handover support request message and tunnel setup information of the terminal 400. Here, the tunnel setup information includes the care-of address of the terminal 400 which is used in the serving network 410 and the care-of addresses which are created by the terminal 400 in order to be used in the available networks after the handover of the terminal 400 is performed. That is, the handover initiation request message MIH_Handover_Initiate REQUEST frame includes all information that is transmitted from the MIH user 401 of the terminal 400 to the MIH layer 403 of the terminal 400 through the MIH tunnel setup request message MIH_Tunnel_setup.request in operation 441 above.

The MIH layer 413 of the serving network 410 checks the tunnel setup information from the handover initiation request message MIH_Handover_Initiate REQUEST frame that is received from the MIH layer 403 of the terminal 400. Then, the MIH 413 transmits a tunnel setup preparation request message Tunnel_Setup_Prepare.request to an AR 415 so that the serving network 410 forms the tunnels connected to the neighboring WLANs of the terminal 400, in operation 445. Here, the AR 415 represents a network layer of the serving network 410.

In this case, when the tunnel setup preparation request message Tunnel_Setup_Prepare.request is received from the MIH layer 413, the AR 415 prepares to form the tunnels connected to the available networks.

Also, the MIH layer 413 transmits a handover preparation request message MIH_Handover_Prepare REQUEST frame including the care-of addresses of the available networks and handover request information of the terminal 400, to each of MIH layers of the neighboring networks in operation 447. In this case, the handover preparation request message MIH_Handover_Prepare REQUEST frame does not include all care-of addresses which are provided from the MIH layer 403 of the terminal 400 to the MIH layer 413 of the serving network 410, but includes only the care-of addresses which are created by the terminal 400 in order to be used in the available networks after the handover of the terminal 400 is performed. Thus, the size of the handover preparation request message MIH_Handover_Prepare REQUEST frame may be reduced.

Hereinafter, a target network 420 from among the available networks will be described as a representative example.

An MIH layer 423 of the target network 420 checks the handover request information of the terminal 400 and a care-of address that is created by the terminal 400 from the handover preparation request message MIH_Handover_Prepare REQUEST frame that is received from the MIH layer 413 of the serving network 410. Then, the MIH layer 423 determines whether resources requested to perform the handover by the terminal 400 are supportable.

Also, the MIH layer 423 transmits a tunnel setup request message Tunnel_Setup.request including the care-of address to an AR 425 in order to form a tunnel connected to the serving network 410, in operation 449. For example, the MIH layer 423 may transmit the tunnel setup request message Tunnel_Setup.request to the AR 425 only if the target network 420 supports the handover of the terminal 400. Here, the AR 425 represents a network layer of the target network 420.

The AR 425 checks the care-of address which is created by the terminal 400 and is included in the tunnel setup request message Tunnel_Setup.request. In this case, the AR 425 determines whether the care-of address is usable, by performing duplicate address detection (DAD). That is, the AR 425 determines whether the care-of address is not duplicated with an address or another care-of address which is used by another terminal. Then, the AR 425 transmits a determination result to the MIH layer 423 by using a tunnel setup response message Tunnel_Setup.response in operation 451. For example, if it is determined that the care-of address is usable, the tunnel setup response message Tunnel_Setup.response includes authentication information of the care-of address. If it is determined that the care-of address is not usable, the tunnel setup response message Tunnel_Setup.response includes a newly created care-of address.

In this case, the AR 425 creates an end point of the tunnel connected to the serving network 410 by using the care-of address, and prepares to receive data through the tunnel.

The MIH layer 423 checks the care-of address from the tunnel setup response message Tunnel_Setup.response that is received from the AR 425. Then, the MIH layer 423 transmits handover support information on the terminal 400 and the care-of address to the MIH layer 413 of the serving network 410, by using a handover preparation response message MIH_Handover_Prepare RESPONSE frame in operation 453.

The MIH layer 413 of the serving network 410 checks the handover support information on the terminal 400 and the care-of addresses which are included in the handover preparation response message MIH_Handover_Prepare RESPONSE frame that is received form the available networks. Then, the MIH layer 413 transmits the tunnel setup request message Tunnel_Setup.request including the care-of addresses of the available networks which support the handover of the terminal 400, to the AR 415 in operation 455.

The AR 415 checks the care-of addresses of the available networks which support the handover of the terminal 400 from the tunnel setup request message Tunnel_Setup.request that is received from the MIH layer 413. Then, the AR 415 forms the tunnels connected to the available networks by using the care-of addresses, and notifies the MIH layer 413 that the tunnels are formed, by using the tunnel setup response message Tunnel_Setup.response in operation 457. In this case, the tunnels formed between the serving network 410 and the available-networks are maintained to be inactivated.

When the tunnel setup response message Tunnel_Setup.response is received, the MIH layer 413 transmits a handover initiation response message MIH_Handover_Initiate RESPONSE frame including the handover support information and the care-of addresses of the available networks, to the MIH layer 403 of the terminal 400 in operation 459.

The MIH layer 403 of the terminal 400 checks the handover support information and the care-of addresses of the available networks from the handover initiation response message MIH_Handover_Initiate RESPONSE frame that is received from the MIH layer 413 of the serving network 410. Then, the MIH layer 403 transmits an MIH handover initiation response message MIH_Handover_initiate.response including the handover support information and the care-of addresses of the available networks, to the MIH user 401 in operation 461. In this case, the MIH layer 403 includes an MIH tunnel setup response message MIH_Tunnel_setup.response including the tunnel setup information of the serving network 410 into the MIH handover initiation response message MIH_Handover_initiate.response before being transmitted.

The MIH user 401 checks the available networks which support the handover of the terminal 400, from the MIH handover initiation response message MIH_Handover_initiate.response that is received from the MIH layer 403. Then, the MIH user 401 determines the target network 420 to which the handover of the terminal 400 is performed, from among the available networks. The MIH user 401 transmits information on the target network 420 to the MIH layer 403 by using an MIH switch request message MIH_Switch.request, in operation 463.

Then, because the target network 420 is a WLAN, the terminal 400 performs layer-2 (L2) handover to the target network 420 by using a WLAN MAC layer 407 in operation 465. That is, the WLAN MAC layer 407 performs authentication and association with an access point (AP) 421 of the target network 420 in order to perform the L2 handover.

When a new link connected to the target network 420 is created in accordance with the L2 handover, the WLAN MAC layer 407 notifies the MIH layer 403 that the new link is created, by creating a linkup (LUP) event Link_Up.indication in operation 467.

When the LUP event Link_Up.indication is created by the WLAN MAC layer 407, the MIH layer 403 notifies the MIH user 401 that the new link connected to the target network 420 is created, by creating an MIH LUP event MIH_Link_Up.indication in operation 469.

Then, the WLAN MAC layer 407 notifies the MIH layer 403 that the L2 handover is completely performed, by creating a link handover completion event Link_Handover_Complete.indication in operation 471.

When the link handover completion event Link_Handover_Complete.indication is created by the WLAN MAC layer 407, the MIH layer 403 transmits L2 handover completion information to the MIH user 401 by using an MIH switch response message MIH_Switch.response in operation 473.

A method of performing handover of a terminal in a wireless communication system after the method described above with reference to FIG. 4 is performed will now be described.

Figure 5:
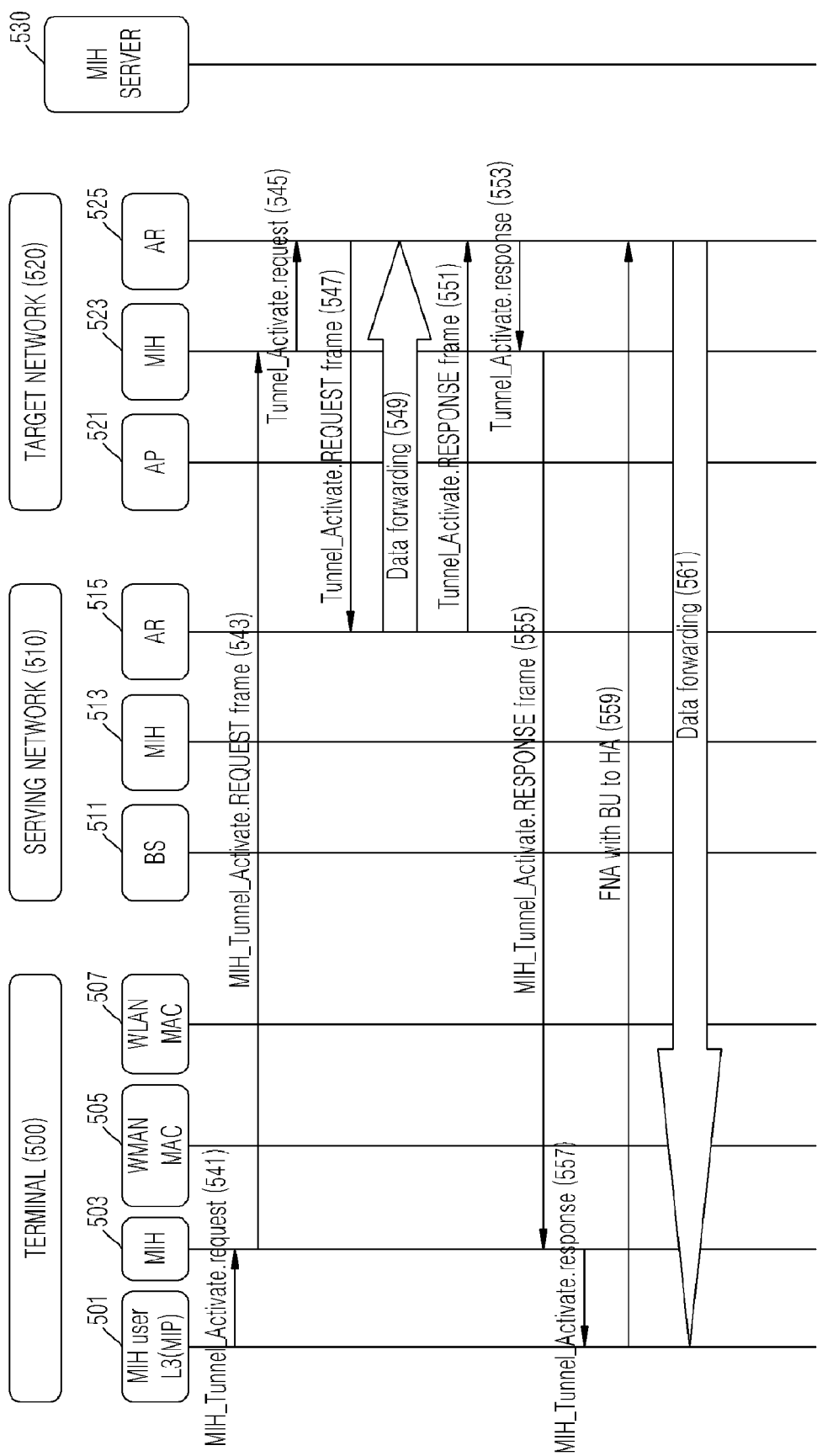
FIG. 5 is a diagram for describing a method of performing fast handover based on MIH in a wireless communication system, according to an embodiment.

FIG. 5 is a diagram for describing a method of performing fast handover based on MIH in a wireless communication system, according to an embodiment.

Referring to FIG. 5, a terminal 500 and an MIH user 501 transmits an MIH tunnel activation request message MIH_Tunnel_Active.request to an MIH layer 503 in order to activate a tunnel between a serving network 510 and a target network 520, in operation 541. That is, the MIH user 501 transmits the MIH tunnel activation request message MIH_Tunnel_Active.request to the MIH layer 503 so that the tunnel between the serving network 510 and the target network 520 is activated in order to reduce data loss when handover of the terminal 500 is performed. Here, the MIH user 501 represents a network layer of the terminal 500.

When the MIH tunnel activation request message MIH_Tunnel_Active.request is received, the MIH layer 503 transmits an MIH tunnel activation request frame MIH_Tunnel_Activate.REQUEST frame to an MIH layer 523 of the target network 520 in order to activate the tunnel, in operation 543.

When the MIH tunnel activation request frame MIH_Tunnel_Activate.REQUEST frame is received, the MIH layer 523 of the target network 520 transmits a tunnel activation request message Tunnel_Activate.request to an AR 525 in order to activate the tunnel connected to the serving network 510, in operation 545. Here, the AR 525 represents a network layer of the target network 520.

When the tunnel activation request message Tunnel_Activate.request is received, the AR 525 transmits a tunnel activation request frame Tunnel_Activate REQUEST frame to an AR 515 of the serving network 510 so that the serving network 510 may also activate the tunnel, in operation 547. Here, the AR 515 represents a network layer of the serving network 510.

When the tunnel activation request frame Tunnel_Activate REQUEST frame is received, the AR 515 of the serving network 510 forwards data to be forwarded to the terminal 500, to the AR 525 of the target network 520 in operation 549. In this case, the AR 525 of the target network 520 temporarily stores the data of the terminal 500 which is received from the AR 515 of the serving network 510.

Then, the AR 515 of the serving network 510 notifies the AR 525 of the target network 520 that the tunnel is activated, by using a tunnel activation response frame Tunnel_Activate RESPONSE frame, in operation 551.

When the tunnel activation response frame Tunnel_Activate RESPONSE frame is received, the AR 525 of the target network 520 notifies the MIH layer 523 that the tunnel connected to the serving network 510 is activated, by using a tunnel activation response message Tunnel_Activate.response, in operation 553.

When the tunnel activation response message Tunnel_Activate.response is received, the MIH layer 523 notifies the MIH layer 503 of the terminal 500 that the tunnel connected to the serving network 510 is activated, by using an MIH tunnel activation response frame MIH_Tunnel_Activate.RESPONSE frame, in operation 555.

When the MIH tunnel activation response frame MIH_Tunnel_Activate.RESPONSE frame is received, the MIH layer 503 of the terminal 500 notifies the MIH user 501 that the tunnel is activated, by using an MIH tunnel activation response message MIH Tunnel_Activate.response, in operation 557.

Figure 1:
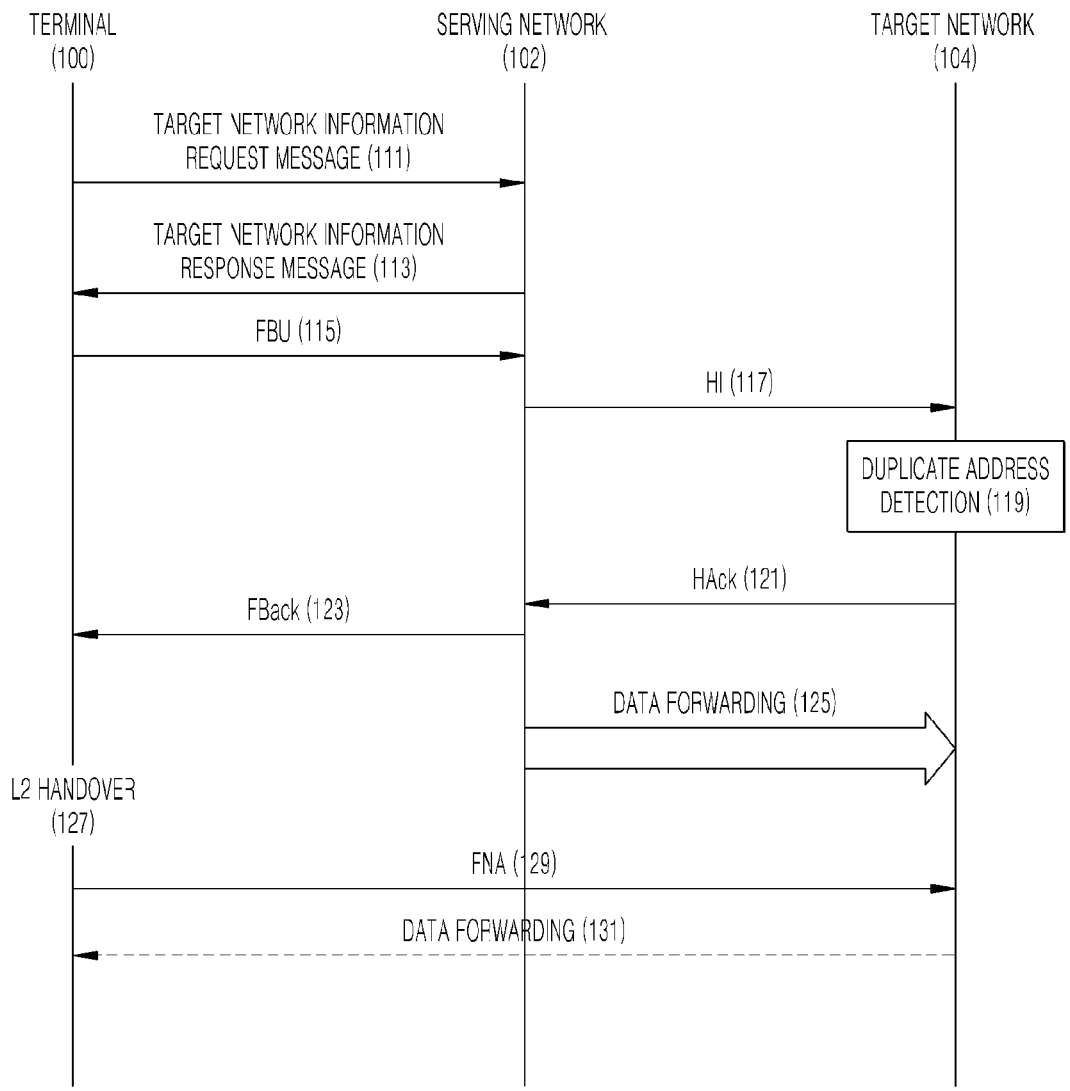
FIG. 1 is a diagram for describing a conventional method of performing fast handover in a wireless communication system.

When the MIH tunnel activation response message MIH Tunnel_Activate.response is received, the MIH user 501 transmits a fast neighbor advertisement (FNA) message to the AR 525 of the target network 520 so as to notify that the handover is completely performed, in operation 559. Here, the FNA message performs the same function as the FNA message that is transmitted by the terminal 100 illustrated in FIG. 1 when handover is completely performed. Also, the FNA message may include a binding update message required for performing the handover of the terminal 500 which is defined by a mobile Internet protocol (IP) technology.

When the FNA message is received, the AR 525 of the target network 520 forwards data to the terminal 500 in operation 561. In this case, the AR 525 also forwards the data which is received from the serving network 510 and is temporarily stored, to the terminal 500.

As described above, in FIG. 5, a terminal transmits control messages for activating a tunnel to a target network and the target network transmits the control messages to a serving network. According to another embodiment, in FIG. 6, a terminal transmits control messages for activating a tunnel to a serving network and the serving network transmits the control messages to a target network.

Figure 6:
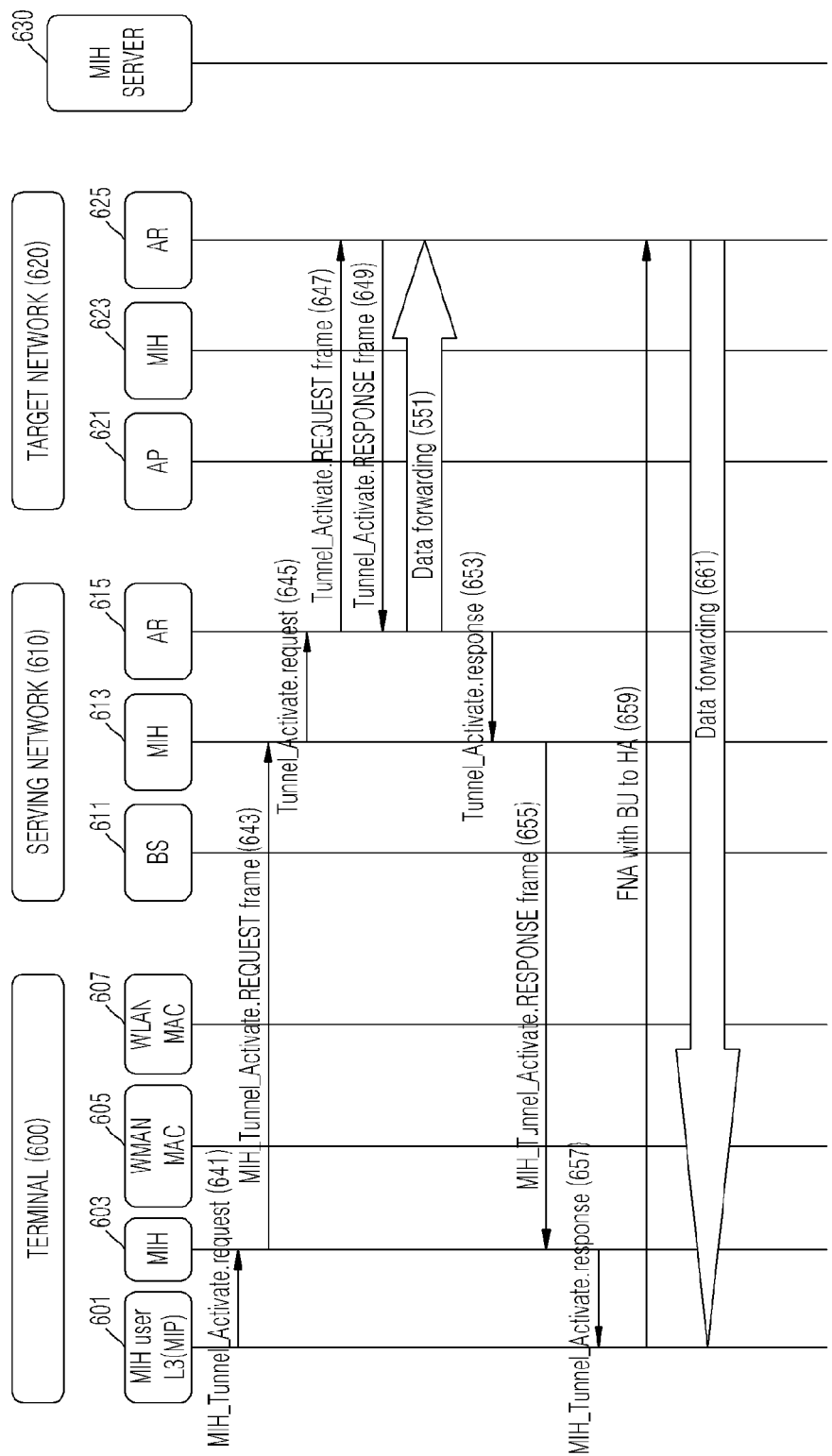
FIG. 6 is a diagram for describing another method of performing fast handover based on MIH in a wireless communication system, according to an embodiment.

FIG. 6 is a diagram for describing another method of performing fast handover based on MIH in a wireless communication system, according to an embodiment.

Referring to FIG. 6, an MIH user 601 of a terminal 600 transmits an MIH tunnel activation request message MIH_Tunnel_Active.request to an MIH layer 603 in order to activate a tunnel between a serving network 610 and a target network 620, in operation 641. That is, the MIH user 601 transmits the MIH tunnel activation request message MIH_Tunnel_Active.request to the MIH layer 603 so that the tunnel between the serving network 610 and the target network 620 is activated in order to reduce data loss when handover of the terminal 600 is performed. Here, the MIH user 601 represents a network layer of the terminal 600.

When the MIH tunnel activation request message MIH_Tunnel_Active.request is received, the MIH layer 603 transmits an MIH tunnel activation request frame MIH_Tunnel_Activate.REQUEST frame to an MIH layer 613 of the serving network 610 in order to activate the tunnel, in operation 643.

When the MIH tunnel activation request frame MIH_Tunnel_Activate.REQUEST frame is received, the MIH layer 613 of the serving network 610 transmits a tunnel activation request message Tunnel_Activate.request to an AR 615 in order to activate the tunnel connected to the target network 620, in operation 645. Here, the AR 615 represents a network layer of the serving network 610.

When the tunnel activation request message Tunnel_Activate.request is received, the AR 615 transmits a tunnel activation request frame Tunnel_Activate REQUEST frame to an AR 625 of the target network 620 so that the target network 620 may also activate the tunnel, in operation 647. Here, the AR 625 represents a network layer of the target network 620.

When the tunnel activation request frame Tunnel_Activate REQUEST frame is received, the AR 625 of the target network 620 activates the tunnel connected to the serving network 610. Then, the AR 625 notifies the AR 615 of the serving network 610 that the tunnel is activated, by using a tunnel activation response frame Tunnel_Activate RESPONSE frame, in operation 649.

When the tunnel activation response frame Tunnel_Activate RESPONSE frame is received, the AR 615 of the serving network 610 forwards data to be forwarded to the terminal 600, to the AR 625 of the target network 620 in operation 651. In this case, the AR 625 of the target network 620 temporarily stores the data of the terminal 600 which is received from the AR 615 of the serving network 610.

Then, the AR 615 notifies the MIH layer 613 that the tunnel connected to the target network 620 is activated, by using a tunnel activation response message Tunnel_Activate.response, in operation 653.

When the tunnel activation response message Tunnel_Activate.response is received, the MIH layer 613 notifies the MIH layer 603 of the terminal 600 that the tunnel connected to the target network 620 is activated, by using an MIH tunnel activation response frame MIH_Tunnel_Activate.RESPONSE frame, in operation 655.

When the MIH tunnel activation response frame MIH_Tunnel_Activate.RESPONSE frame is received, the MIH layer 603 of the terminal 600 notifies the MIH user 601 that the tunnel is activated, by using an MIH tunnel activation response message MIH Tunnel_Activate.response, in operation 657.

When the MIH tunnel activation response message MIH Tunnel_Activate.response is received, the MIH user 601 transmits an FNA message to the AR 625 of the target network 620 so as to notify that the handover is completely performed, in operation 659. Here, the FNA message performs the same function as the FNA message that is transmitted by the terminal 500 illustrated in FIG. 5 when handover is completely performed. Also, the FNA message may include a binding update message required for performing the handover of the terminal 600 which is defined by a mobile IP technology.

When the FNA message is received, the AR 625 of the target network 620 forwards data to the terminal 600 in operation 661. In this case, the AR 625 also forwards the data which is received from the serving network 610 and is temporarily stored, to the terminal 600.

As described above, in a wireless communication system according to an embodiment, data is transmitted by activating a tunnel between a serving network and a network that is selected as a target network, as illustrated in FIGS. 5 and 6. However, in the wireless communication system, preparation procedures for forming tunnels between the serving network and a plurality of available networks are performed as illustrated in FIG. 4. Thus, the available networks store data for forming the tunnels connected to the serving network. In this case, the data is useless to unselected networks. Furthermore, due to the data, unintended results may be incurred in the unselected networks. Thus, the unselected networks have to delete the data.

Accordingly, in the wireless communication system, the data that is stored in the available networks during the preparation procedures for forming the tunnels is managed in a soft state. Here, the soft state means that data is managed by a timer and the data is deleted unless the data is updated within a predetermined period of time.

In more detail, the data stored in a network that is selected as the target network from among the available networks is updated by activating the tunnel as illustrated in FIGS. 5 and 6 and thus is not deleted. However, the data stored in the unselected networks is not updated within the predetermined period of time and thus is deleted.

Secondarily, a method of performing handover of a terminal that receives services, from a WLAN network to a WMAN will be described. Hereinafter, it is assumed that the WLAN is a serving network and the WMAN is a target network.

Figure 7:
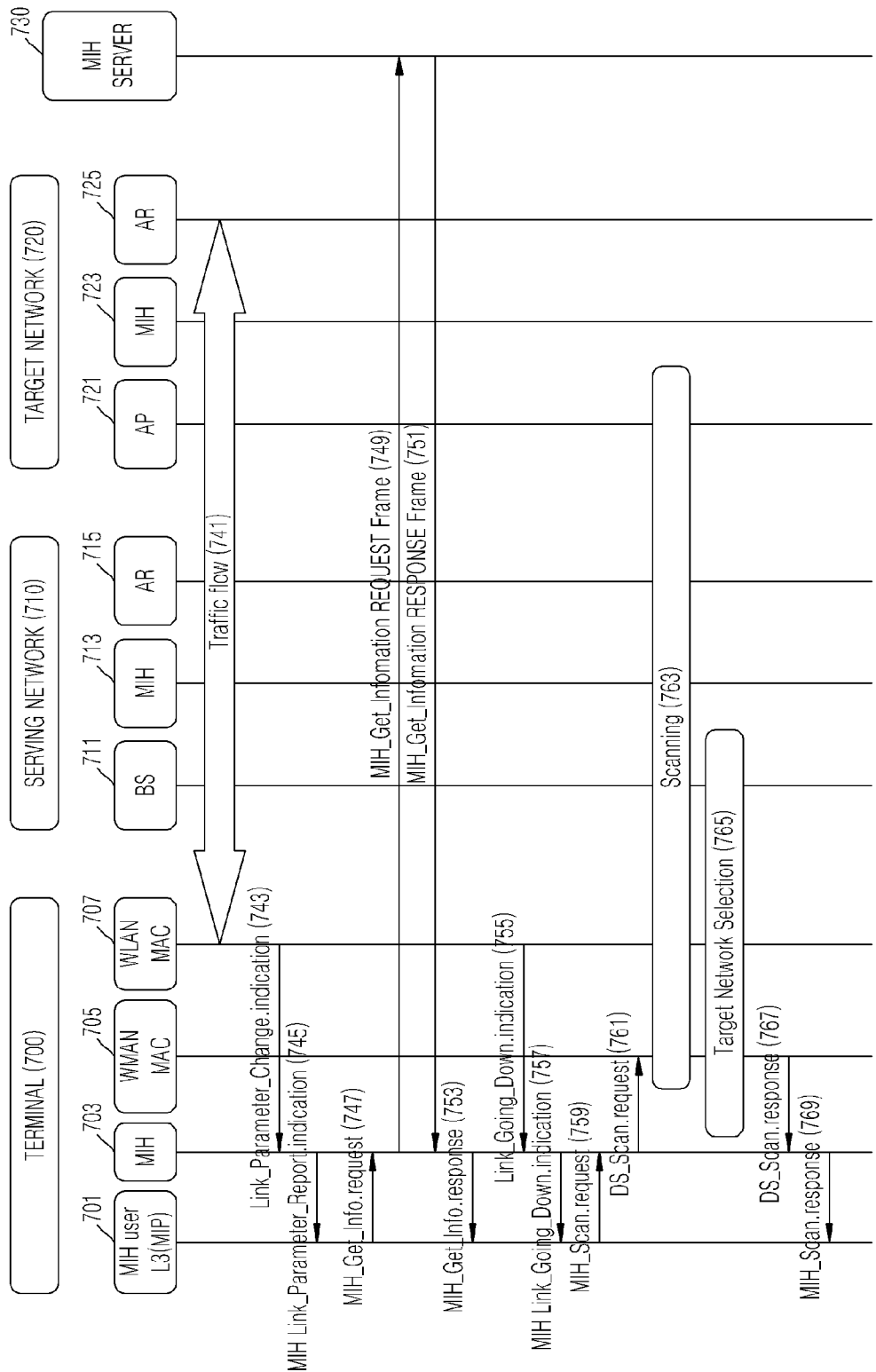
FIG. 7 is a diagram for describing a method of selecting a target network based on MIH in a wireless communication system, according to another embodiment.

FIG. 7 is a diagram for describing a method of selecting a target network 710 based on MIH in a wireless communication system, according to another embodiment.

Referring to FIG. 7, a terminal 700 communicates with an AR 725 that is a network layer of a serving network 720, by using a WLAN MAC layer 707 in operation 741.

If a state of a link through which communication is currently performed is changed, the WLAN MAC layer 707 notifies an MIH layer 703 that the state of the link is changed, by using a link variable change event Link_Parameters_Change.indication that is defined by an MIH technology, in operation 743.

When the link variable change event Link_Parameters_Change.indication is created, the MIH layer 703 notifies an MIH user 701 that the state of the link connected to the serving network 720 is changed, by using a link variable report event MIH Link_Parameter_Report.indication in operation 745. In this case, the MIH layer 703 transmits link state change information and information on how the state of the link is changed, to the MIH user 701.

The MIH user 701 determines whether handover of the terminal 700 is required, by using the link state change information that is received from the MIH layer 703 through the link variable report event MIH Link_Parameter_Report.indication. Then, if it is determined that the handover of the terminal 700 is required, the MIH user 701 transmits an MIH neighboring network information request message MIH_Get_Info.request to the MIH layer 703 in operation 747.

When the MIH neighboring network information request message MIH_Get_Info.request is received, the MIH layer 703 transmits a neighboring network information request message MIH_Get_Information REQUEST Frame to an MIH server 730 in operation 749.

When the neighboring network information request message MIH_Get_Information REQUEST Frame is received, the MIH server 730 transmits a neighboring network information response message MIH_Get_Information RESPONSE Frame including information on neighboring networks of the terminal 700, to the MIH layer 703 in operation 751. Here, the information on the neighboring networks includes network address information of the neighboring networks. Also, the information on the neighboring networks may include any information to be used when the terminal 700 determines the target network 710. Thus, the MIH server 730 has to maintain and manage the information on the neighboring networks. In the following description of the present invention, only vertical handover of a terminal will be described and thus a method of managing information on neighboring networks will not be mentioned.

The MIH layer 703 checks the information on the neighboring networks of the terminal 700 from the neighboring network information response message MIH_Get_Information RESPONSE Frame that is received from the MIH server 730. Then, the MIH layer 703 provides an MIH neighboring network information response message MIH_Get_Info.response including the information on the neighboring networks, to the MIH user 701 in operation 753. In this case, the MIH user 701 creates new network addresses of the neighboring networks by using network addresses of the neighboring networks which are included in the MIH neighboring network information response message MIH_Get_Info.response. For example, the MIH user 701 creates new care-of addresses of the neighboring networks.

Then, the WLAN MAC layer 707 checks the state of the link connected to the serving network 720. If it is determined that the link connected to the serving network 720 is to be going down, the WLAN MAC layer 707 transmits the link state change information to the MIH layer 703 by using an LGD event Link_Going_Down.indication in operation 755.

When the LGD event Link_Going_Down.indication is created, the MIH layer 703 notifies the MIH user 701 of the link state change information of the link connected to the serving network 720 by using an MIH LGD event MIH Link_Going_Down.indication in operation 757.

If it is determined that the link connected to the serving network 720 is to be going down by using the link state change information that is received from the MIH layer 703 through the MIH LGD event MIH Link_Going_Down.indication, the MIH user 701 transmits a MIH scan request message MIH_Scan.request to the MIH layer 703 in operation 759. That is, the MIH user 701 transmits the MIH scan request message MIH_Scan.request for activating a WMAN MAC layer 705, to the MIH layer 703 in order to find the target network 710 to which the handover is performed.

When the MIH scan request message MIH_Scan.request is received, the MIH layer 703 transmits a scan request message DS_Scan.request to the WMAN MAC layer 705 in operation 761. That is, when the terminal 700 communicates with the serving network 720, the WMAN MAC layer 705 is inactivated. Thus, the MIH layer 703 transmits the scan request message DS_Scan.request to the WMAN MAC layer 705 in order to activate the WMAN MAC layer 705.

When the scan request message DS_Scan.request is received, the WMAN MAC layer 705 obtains information on neighboring WMANs of the terminal 700 by performing a periodical scanning process, in accordance with a method defined by a WMAN standard, in operation 763. Then, the WMAN MAC layer 705 selects the target network 710 by using the information on the neighboring WMANs in operation 765.

Here, the target network 710 may include one or more networks. Information required to select the target network 710 to which the handover of the terminal 700 is actually performed may include information obtained by performing the periodical scanning process and information to be obtained by performing a method to be described below with reference to FIG. 8. The target network 710 is selected by collectively considering all information. In the following description of the disclosed embodiments, a method of selecting a target network will not be described and thus will not be mentioned further.

After the target network 710 is selected, the WMAN MAC layer 705 transmits information on the target network 710 to the MIH layer 703 by using a scan response message DS_Scan.response in operation 767.

The MIH layer 703 checks the information on the target network 710 from the scan response message DS_Scan.response that is received from the WMAN MAC layer 705. Then, the MIH layer 703 transmits an MIH scan response message MIH_Scan.response including the information on the target network 710 to the MIH user 701 in operation 769.

A method of forming a tunnel between a serving network and a target network in a wireless communication system after the method described above with reference to FIG. 7 is performed will now be described.

Figure 8:
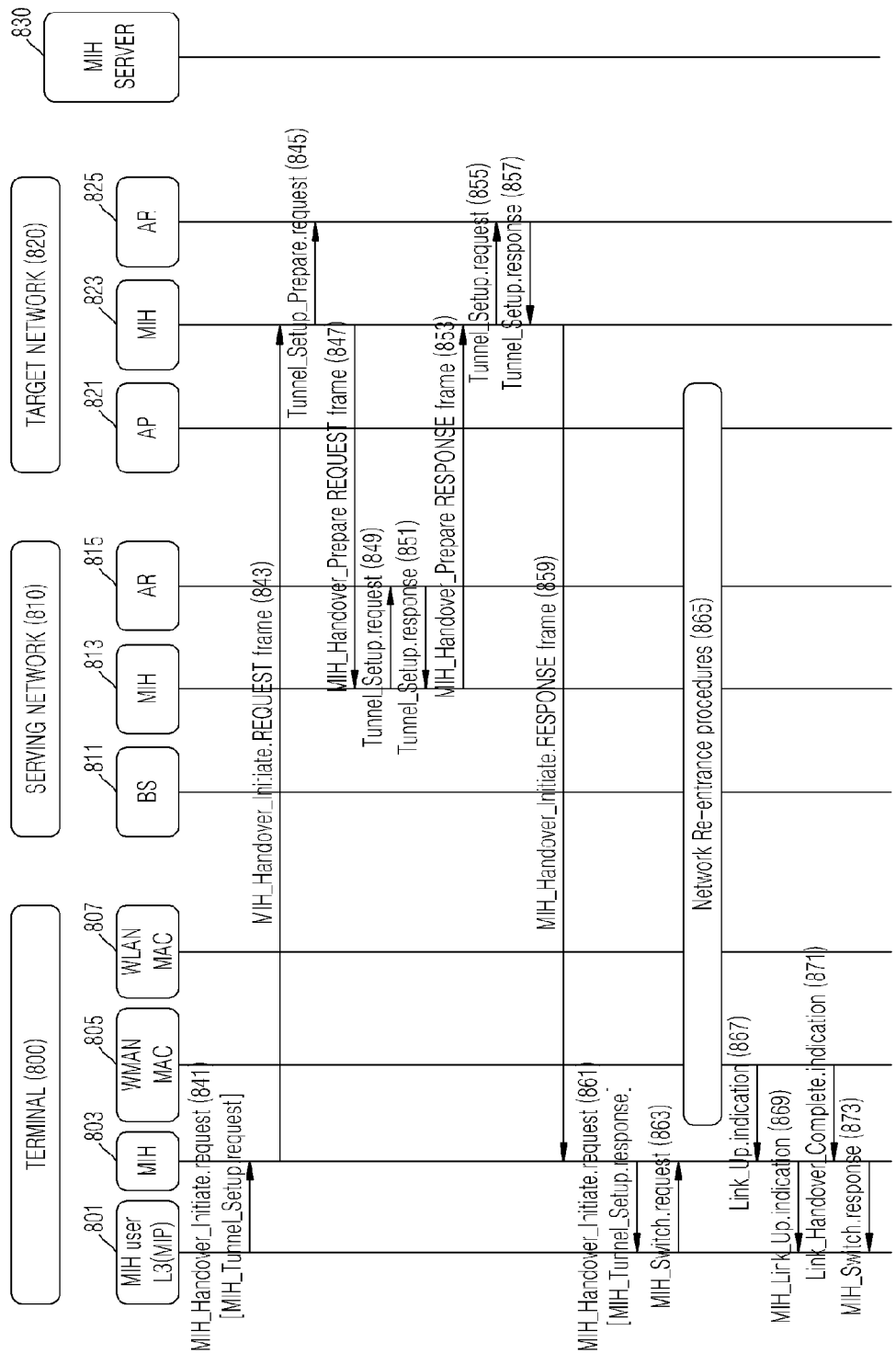
FIG. 8 is a diagram for describing a method of forming a tunnel based on MIH in a wireless communication system, according to another embodiment.

FIG. 8 is a diagram for describing a method of forming a tunnel based on MIH in a wireless communication system, according to another embodiment.

Referring to FIG. 8, an MIH user 801 of a terminal 800 obtains information on a target network 810 that is selected as described above with reference to FIG. 7. Then, the MIH user 801 transmits a MIH handover initiation request message MIH_Handover_initiate.request to a MIH layer 803 in order to check whether the target network 810 may support handover of the terminal 800 in operation 841.

In this case, the MIH user 801 prepares to form the tunnel between a serving network 820 and the target network 810. For example, in order to form the tunnel between the serving network 820 and the target network 810, start and end points of the serving network 820 and the target network 810 are necessary. Thus, the MIH user 801 includes an MIH tunnel setup request message MIH_Tunnel_setup.request including a care-of address of the target network 810 into the MIH handover initiation request message MIH_Handover_initiate.request. In this case, the MIH tunnel setup request message MIH_Tunnel_setup.request includes a care-of address of the terminal 800 which is used in the serving network 820 and a care-of address that is created by the terminal 800 in order to be used in the target network 810 after the handover of the terminal 800 is performed.

When the MIH handover initiation request message MIH_Handover_initiate.request is received, the MIH layer 803 transmits a handover initiation request message MIH_Handover_Initiate REQUEST frame to an MIH layer 823 of the serving network 820 in operation 843. In this case, the handover initiation request message MIH_Handover_Initiate REQUEST frame includes a handover support request message and tunnel setup information of the terminal 800. Here, the tunnel setup information includes the care-of address of the terminal 800 which is used in the serving network 820 and the care-of address that is created by the terminal 800 in order to be used in the target network 810 after the handover of the terminal 800 is performed. That is, the tunnel setup information includes all information that is transmitted from the MIH user 801 of the terminal 800 to the MIH layer 803 of the terminal 800 through the MIH tunnel setup request message MIH_Tunnel_setup.request in operation 841 above.

The MIH layer 823 of the serving network 820 checks the tunnel setup information from the handover initiation request message MIH_Handover_Initiate REQUEST frame that is received from the MIH layer 803 of the terminal 800. Then, the MIH 823 transmits a tunnel setup preparation request message Tunnel_Setup_Prepare.request to an AR 825 so that the serving network 820 forms the tunnel connected to the target network 810, in operation 845. Here, the AR 825 represents a network layer of the serving network 820.

In this case, when the tunnel setup preparation request message Tunnel_Setup_Prepare.request is received from the MIH layer 823, the AR 825 prepares to form the tunnel connected to the target network 810.

Also, the MIH layer 823 transmits a handover preparation request message MIH_Handover_Prepare REQUEST frame including the care-of address of the target network 810 and handover request information of the terminal 800, to an MIH layer 813 of the target network 810 in operation 847. In this case, if the target network 810 includes two or more networks, the MIH layer 823 has to transmit the handover preparation request message MIH_Handover_Prepare REQUEST frame to the two or more networks as described above with reference to FIG. 4. Furthermore, in this case, the handover preparation request message MIH_Handover_Prepare REQUEST frame does not include all care-of addresses which are provided from the MIH layer 803 of the terminal 800 to the MIH layer 823 of the serving network 820, but includes only care-of addresses which are created by the terminal 800 in order to be used in the target network 810 after the handover of the terminal 800 is performed. Thus, the MIH layer 823 may reduce the size of control messages to be transmitted to the target network 810. Hereinafter, the target network 810 will be exemplarily described.

An MIH layer 813 of the target network 810 checks the handover request information of the terminal 800 and the care-of address that is created by the terminal 800 from the handover preparation request message MIH_Handover_Prepare REQUEST frame that is received from the MIH layer 823 of the serving network 820. Then, the MIH layer 813 determines whether resources requested to perform the handover by the terminal 800 are supportable.

Also, the MIH layer 813 transmits a tunnel setup request message Tunnel_Setup.request including the care-of address to an AR 815 in order to form the tunnel connected to the serving network 820, in operation 849. For example, the MIH layer 813 may transmit the tunnel setup request message Tunnel_Setup.request to the AR 815 only if the target network 810 supports the handover of the terminal 800. Here, the AR 815 represents a network layer of the target network 810.

The AR 815 checks the care-of address which is created by the terminal 800 and is included in the tunnel setup request message Tunnel_Setup.request. In this case, the AR 815 determines whether the care-of address is usable, by performing DAD. That is, the AR 815 determines whether the care-of address is not duplicated with an address or another care-of address which is used by another terminal. Then, the AR 815 transmits a determination result to the MIH layer 813 by using a tunnel setup response message Tunnel_Setup.response in operation 851. For example, if it is determined that the care-of address is usable, the tunnel setup response message Tunnel_Setup.response includes authentication information of the care-of address. If it is determined that the care-of address is not usable, the tunnel setup response message Tunnel_Setup.response includes a newly created care-of address.

In this case, the AR 815 creates an end point of the tunnel connected to the serving network 820 by using the care-of address, and prepares to receive data through the tunnel.

The MIH layer 813 checks the care-of address from the tunnel setup response message Tunnel_Setup.response that is received from the AR 815. Then, the MIH layer 813 transmits handover support information on the terminal 800 and the care-of address to the MIH layer 823 of the serving network 820, by using a handover preparation response message MIH_Handover_Prepare RESPONSE frame in operation 853.

The MIH layer 823 of the serving network 820 checks the handover support information on the terminal 800 and the care-of address which are included in the handover preparation response message MIH_Handover_Prepare RESPONSE frame that is received form the MIH layer 813 of the target network 810. Then, the MIH layer 823 transmits the tunnel setup request message Tunnel_Setup.request including the care-of address of the target network 810, to the AR 825 in operation 855.

The AR 825 checks the care-of address of the target network 810 from the tunnel setup request message Tunnel_Setup.request that is received from the MIH layer 823. Then, the AR 825 forms the tunnel connected to the target network 810 by using the care-of address, and notifies the MIH layer 823 that the tunnel are formed, by using the tunnel setup response message Tunnel_Setup.response in operation 857. In this case, the tunnel formed between the serving network 820 and the target network 810 is maintained to be inactivated.

When the tunnel setup response message Tunnel_Setup.response is received, the MIH layer 823 transmits a handover initiation response message MIH_Handover_Initiate RESPONSE frame including the handover support information on the terminal 800 and the care-of address of the target network 810, to the MIH layer 803 of the terminal 800 in operation 859.

The MIH layer 803 of the terminal 800 checks the handover support information on the terminal 800 and the care-of address of the target network 810 from the handover initiation response message MIH_Handover_Initiate RESPONSE frame that is received from the MIH layer 823 of the serving network 820. Then, the MIH layer 803 transmits an MIH handover initiation response message MIH_Handover_initiate.response including the handover support information and the care-of address of the target network 810, to the MIH user 801 in operation 861. In this case, the MIH layer 803 includes an MIH tunnel setup response message MIH_Tunnel_setup.response including the tunnel setup information of the serving network 820 into the MIH handover initiation response message MIH_Handover_initiate.response before being transmitted.

The MIH user 801 checks whether the target network 810 supports the handover of the terminal 800, from the MIH handover initiation response message MIH_Handover_initiate.response that is received from the MIH layer 803.

If the target network 810 supports the handover of the terminal 800, the MIH user 801 notifies the MIH layer 803 that the handover of the terminal 800 is to be performed to the target network 810, by using an MIH switch request message MIH_Switch.request, in operation 863.

Then, because the target network 810 is a WMAN, the terminal 800 performs L2 handover to the target network 810 by using a WMAN MAC layer 805 in operation 865. That is, the WMAN MAC layer 805 performs network re-approach to a base station (BS) 811 of the target network 810 in order to perform the L2 handover.

When a new link connected to the target network 810 is created in accordance with the L2 handover, the WMAN MAC layer 805 notifies the MIH layer 803 that the new link is created, by creating an LUP event Link_Up.indication in operation 867.

When the LUP event Link_Up.indication is created, the MIH layer 803 notifies the MIH user 801 that the new link connected to the target network 810 is created, by creating an MIH LUP event MIH_Link_Up.indication in operation 869.

Then, after the L2 handover is completely performed, the WMAN MAC layer 805 notifies the MIH layer 803 that the L2 handover is completely performed, by creating a link handover completion event Link_Handover_Complete.indication in operation 871.

When the link handover completion event Link_Handover_Complete.indication is created, the MIH layer 803 transmits L2 handover completion information to the MIH user 801 by using an MIH switch response message MIH_Switch.response in operation 873.

A method of performing handover of a terminal in a wireless communication system after the method described above with reference to FIG. 8 is performed will now be described.

Figure 9:
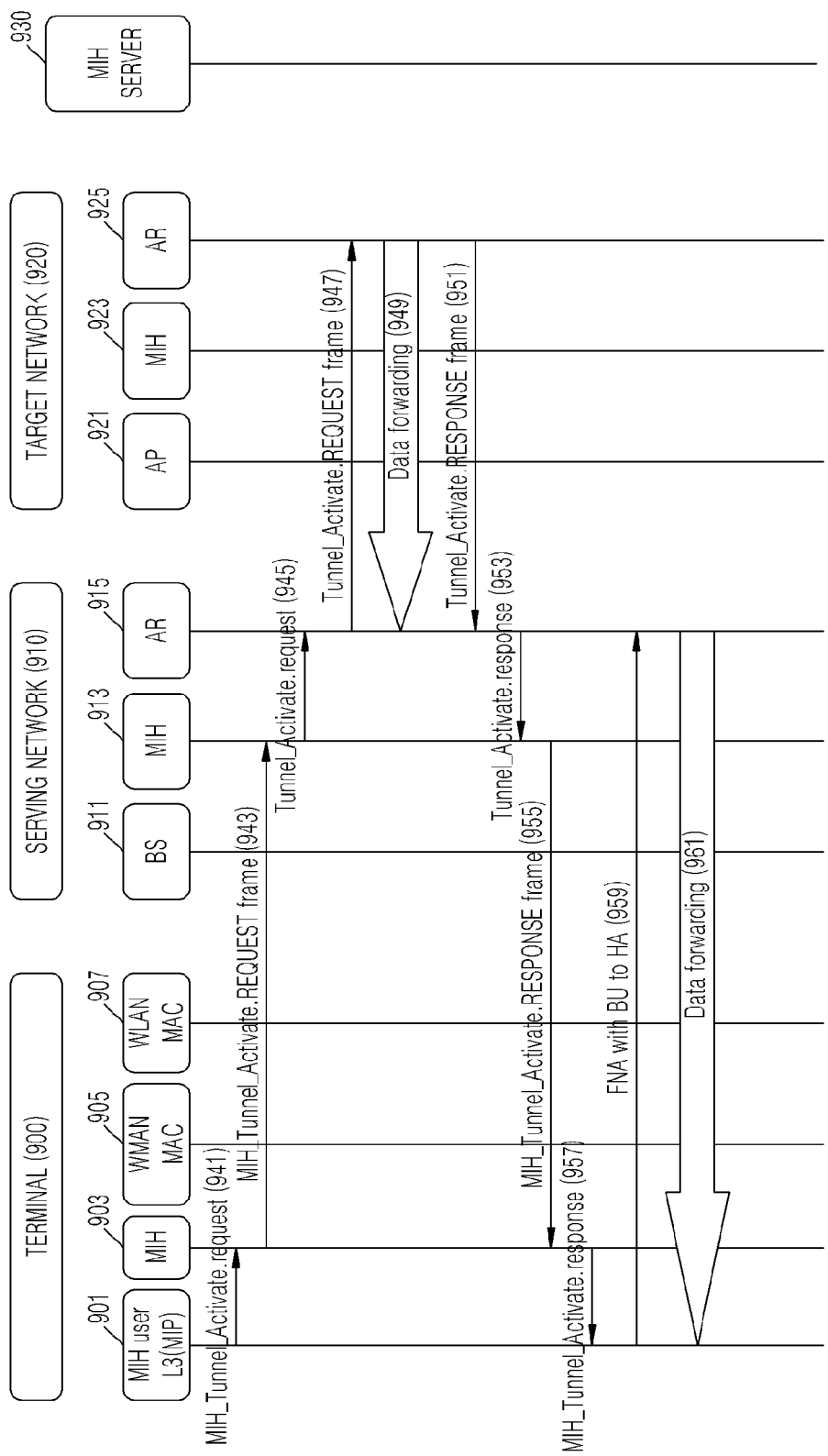
FIG. 9 is a diagram for describing a method of performing fast handover based on MIH in a wireless communication system, according to another embodiment.

FIG. 9 is a diagram for describing a method of performing fast handover based on MIH in a wireless communication system, according to another embodiment of the present invention.

Referring to FIG. 9, a terminal 900 and an MIH user 901 transmits an MIH tunnel activation request message MIH_Tunnel_Active.request to an MIH layer 903 in order to activate a tunnel between a serving network 920 and a target network 910, in operation 941. That is, the MIH user 901 transmits the MIH tunnel activation request message MIH_Tunnel_Active.request to the MIH layer 903 so that the tunnel between the serving network 920 and the target network 910 is activated in order to reduce data loss when handover of the terminal 900 is performed. Here, the MIH user 901 represents a network layer of the terminal 900.

When the MIH tunnel activation request message MIH_Tunnel_Active.request is received, the MIH layer 903 transmits an MIH tunnel activation request frame MIH_Tunnel_Activate.REQUEST frame to an MIH layer 913 of the target network 910 in order to activate the tunnel, in operation 943.

When the MIH tunnel activation request frame MIH_Tunnel_Activate.REQUEST frame is received, the MIH layer 913 of the target network 910 transmits a tunnel activation request message Tunnel_Activate.request to an AR 915 in order to activate the tunnel connected to the serving network 920, in operation 945. Here, the AR 915 represents a network layer of the target network 910.

When the tunnel activation request message Tunnel_Activate.request is received, the AR 915 transmits a tunnel activation request frame Tunnel_Activate REQUEST frame to an AR 925 of the serving network 920 so that the serving network 920 may also activate the tunnel, in operation 947. Here, the AR 925 represents a network layer of the serving network 920.

When the tunnel activation request frame Tunnel_Activate REQUEST frame is received, the AR 925 of the serving network 920 forwards data to be forwarded to the terminal 900, to the AR 915 of the target network 910 in operation 949. In this case, the AR 915 of the target network 910 temporarily stores the data of the terminal 900 which is received from the AR 925 of the serving network 920.

Then, the AR 925 of the serving network 920 notifies the AR 915 of the target network 910 that the tunnel is activated, by using a tunnel activation response frame Tunnel_Activate RESPONSE frame, in operation 951.

When the tunnel activation response frame Tunnel_Activate RESPONSE frame is received, the AR 915 of the target network 910 notifies the MIH layer 913 that the tunnel connected to the serving network 920 is activated, by using a tunnel activation response message Tunnel_Activate.response, in operation 953.

When the tunnel activation response message Tunnel_Activate.response is received, the MIH layer 913 notifies the MIH layer 903 of the terminal 900 that the tunnel connected to the serving network 920 is activated, by using an MIH tunnel activation response frame MIH_Tunnel_Activate.RESPONSE frame, in operation 955.

When the MIH tunnel activation response frame MIH_Tunnel_Activate.RESPONSE frame is received, the MIH layer 903 of the terminal 900 notifies the MIH user 901 that the tunnel is activated, by using an MIH tunnel activation response message MIH Tunnel_Activate.response, in operation 957.

When the MIH tunnel activation response message MIH Tunnel_Activate.response is received, the MIH user 901 transmits an FNA message to the AR 915 of the target network 910 so as to notify that the handover is completely performed, in operation 959. Here, the FNA message the same as the FNA message described above with reference to FIGS. 5 and 6. Also, the FNA message may include a binding update message required for performing the handover of the terminal 900 which is defined by a mobile IP technology.

When the FNA message is received, the AR 915 of the target network 910 forwards data to the terminal 900 in operation 961. In this case, the AR 915 also forwards the data which is received from the serving network 920 and is temporarily stored, to the terminal 900.

As described above, in the wireless communication system illustrated in FIG. 9, a terminal transmits control messages for activating a tunnel to a target network. Then, the target network transmits the control messages to a serving network. According to another embodiment of the present invention, in a wireless communication system illustrated in FIG. 10, a terminal transmits control messages for activating a tunnel to a serving network and the serving network transmits the control messages to a target network.

Figure 10:
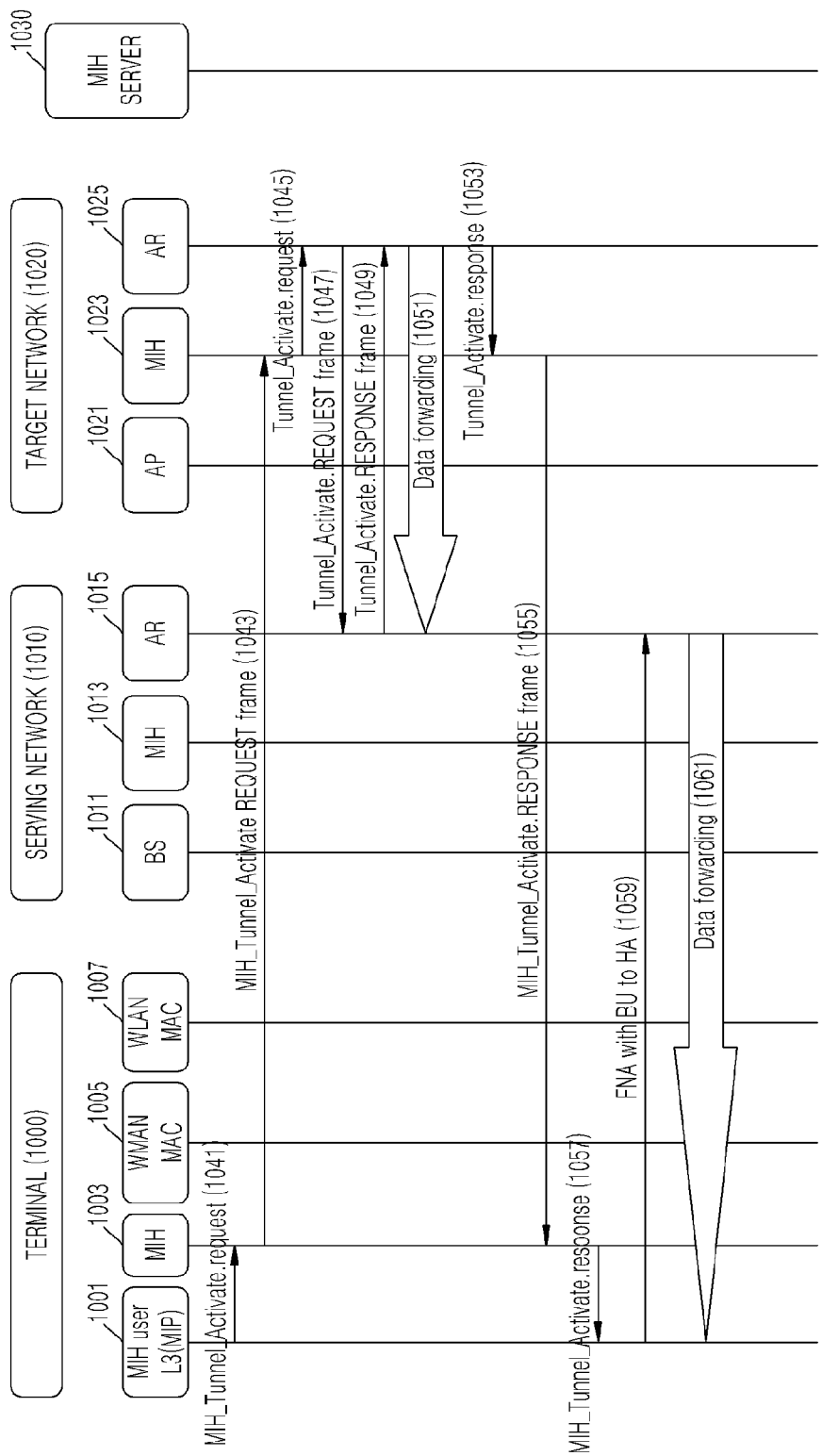
FIG. 10 is a diagram for describing another method of performing fast handover based on MIH in a wireless communication system, according to another embodiment.

FIG. 10 is a diagram for describing another method of performing fast handover based on MIH in a wireless communication system, according to another embodiment.

Referring to FIG. 10, an MIH user 1001 of a terminal 1000 transmits an MIH tunnel activation request message MIH_Tunnel_Active.request to an MIH layer 1003 in order to activate a tunnel between a serving network 1020 and a target network 1010, in operation 1041. That is, the MIH user 1001 transmits the MIH tunnel activation request message MIH_Tunnel_Active.request to the MIH layer 1003 so that the tunnel between the serving network 1020 and the target network 1010 is activated in order to reduce data loss when handover of the terminal 1000 is performed. Here, the MIH user 1001 represents a network layer of the terminal 1000.

When the MIH tunnel activation request message MIH_Tunnel_Active.request is received, the MIH layer 1003 transmits an MIH tunnel activation request frame MIH_Tunnel_Activate.REQUEST frame to an MIH layer 1013 of the serving network 1020 in order to activate the tunnel, in operation 1043.

When the MIH tunnel activation request frame MIH_Tunnel_Activate.REQUEST frame is received, the MIH layer 1013 of the serving network 1020 transmits a tunnel activation request message Tunnel_Activate.request to an AR 1025 in order to activate the tunnel connected to the target network 1010, in operation 1045. Here, the AR 1025 represents a network layer of the serving network 1020.

When the tunnel activation request message Tunnel_Activate.request is received, the AR 1025 transmits a tunnel activation request frame Tunnel_Activate REQUEST frame to an AR 1015 of the target network 1010 so that the target network

1010 may also activate the tunnel, in operation 1047. Here, the AR 1015 represents a network layer of the target network 1010.

When the tunnel activation request frame Tunnel_Activate REQUEST frame is received, the AR 1015 of the target network 1010 activates the tunnel connected to the serving network 1020. Then, the AR 1015 notifies the AR 1025 of the serving network 1020 that the tunnel is activated, by using a tunnel activation response frame Tunnel_Activate RESPONSE frame, in operation 1049.

When the tunnel activation response frame Tunnel_Activate RESPONSE frame is received, the AR 1025 of the serving network 1020 forwards data to be forwarded to the terminal 1000, to the AR 1015 of the target network 1010 in operation 1051. In this case, the AR 1015 of the target network 1010 temporarily stores the data of the terminal 1000 which is received from the AR 1025 of the serving network 1020.

Then, the AR 1025 notifies the MIH layer 1013 that the tunnel connected to the target network 1010 is activated, by using a tunnel activation response message Tunnel_Activate.response, in operation 1053.

When the tunnel activation response message Tunnel_Activate.response is received, the MIH layer 1013 notifies the MIH layer 1003 of the terminal 1000 that the tunnel connected to the target network 1010 is activated, by using an MIH tunnel activation response frame MIH_Tunnel_Activate.RESPONSE frame, in operation 1055.

When the MIH tunnel activation response frame MIH_Tunnel_Activate.RESPONSE frame is received, the MIH layer 1003 of the terminal 1000 notifies the MIH user 1001 that the tunnel is activated, by using an MIH tunnel activation response message MIH Tunnel_Activate.response, in operation 1057.

When the MIH tunnel activation response message MIH Tunnel_Activate.response is received, the MIH user 1001 transmits an FNA message to the AR 1015 of the target network 1010 so as to notify that the handover is completely performed, in operation 1059. Here, the FNA message the same as the FNA message described above with reference to FIGS. 5 and 6. Also, the FNA message may include a binding update message required for performing the handover of the terminal 1000 which is defined by a mobile IP technology.

When the FNA message is received, the AR 1015 of the target network 1010 forwards data to the terminal 1000 in operation 1061. In this case, the AR 1015 also forwards the data which is received from the serving network 1020 and is temporarily stored, to the terminal 1000.

As described above, according to the aspects of the disclosed embodiments, by performing fast handover based on MIH in a wireless communication system, the fast handover may be performed regardless of a mobility management protocol of a network layer, and required time and data loss may be reduced.

While the aspects of the disclosed embodiments have been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of performing handover of a terminal in a wireless communication system, the method comprising:
    obtaining information on neighboring networks from a media independent handover (MIH) server by using a MIH layer if a state of a link connected to a serving network is changed;
    transmitting a handover initiation request message to the MIH layer of the serving network through the MIH layer;
    checking handover support information and tunnel state information of the neighboring networks which are received from the MIH layer of the serving network;
    determining a target network to which handover is performed and performing layer-2 (L2) handover with the target network, by using the handover support information; and
    performing layer-3 (L3) handover with the target network by using the tunnel state information.

2. The method of claim 1, wherein the obtaining of the information on the neighboring networks comprises:
    obtaining the information on the neighboring networks from the MIH server through the MIH layer if the state of the link connected to the serving network is changed;
    activating a media access control (MAC) layer supporting available networks to which the handover is performed if the link connected to the serving network is determined to be going down; and
    obtaining the information on the neighboring networks by using the MAC layer.

3. The method of claim 1, wherein the handover initiation request message includes handover request information and tunnel setup information of the terminal.

4. The method of claim 3, wherein the handover request information includes information on available networks to which the handover is performed, from among the neighboring networks and resource information that is requested to each network when the handover is performed.

5. The method of claim 3, wherein the tunnel setup information includes a network address of the serving network and network addresses of the neighboring networks.

6. The method of claim 1, wherein the tunnel state information includes a network address of the serving network, network addresses of the neighboring networks, and tunnel setup completion information between the serving network and the neighboring networks.

7. The method of claim 1, wherein the performing of the L3 handover comprises:
    transmitting a tunnel activation request signal to the MIH layer of the serving network through the MIH layer by using the tunnel state information; and
    transmitting a handover completion signal to the target network if a tunnel activation signal is received from the MIH layer of the serving network.

8. The method of claim 1, wherein the performing of the L3 handover comprises:
    transmitting a tunnel activation request signal to the MIH layer of the target network through the MIH layer by using the tunnel state information; and
    transmitting a handover completion signal to the target network if a tunnel activation signal is received from the MIH layer of the target network.

9. The method of claim 1, further comprising receiving data from the target network if the L3 handover is completely performed.

10. A method of supporting handover of a terminal by a serving network in a wireless communication system, the method comprising:
- checking handover request information and tunnel setup information from a handover initiation message that is received from the terminal through a media independent handover (MIH) layer;
- forming tunnels with available networks to which the handover of the terminal is performed through the MIH layer by using the tunnel setup information;
- transmitting tunnel formation information to the terminal through the MIH layer;
- checking target network information from a tunnel activation request signal that is received from the terminal through the MIH layer; and
- forwarding data to be forwarded to the terminal, to a target network by activating a tunnel connected to the target network.

11. The method of claim 10, wherein the handover request information includes information on the available networks to which the handover of the terminal is performed and resource information that is requested to each network when the handover is performed.

12. The method of claim 10, wherein the tunnel setup information includes a network address of the serving network and network addresses of the available networks to which the handover of the terminal is performed.

13. The method of claim 10, wherein the forming of the tunnels with the available networks comprises:
- transmitting the handover request information and the tunnel setup information of the terminal to MIH layers of the available networks through the MIH layer;
- checking tunnel state information that is received from the MIH layers of the available networks; and
- forming the tunnels with the available networks by using the tunnel state information.

14. The method of claim 13, further comprising:
- the MIH layer transmitting a tunnel preparation signal to a network layer; and
- the network layer receiving the tunnel preparation signal and preparing to form the tunnels with the available networks.

15. The method of claim 13, further comprising:
- checking handover support information on the terminal which is received from the MIH layers of the available networks;
- checking available networks which support the handover of the terminal from among the available networks, by using the handover support information on the terminal;
- forming the tunnels with the available networks which support the handover of the terminal; and
- transmitting the tunnel formation information and the handover support information to the terminal through the MIH layer.

16. The method of claim 10, further comprising transmitting the tunnel activation request signal to the target network through the MIH layer after the target network is checked from the tunnel activation request signal.

17. A method of supporting handover of a terminal by a target network in a wireless communication system, the method comprising:
- checking handover request information and tunnel setup information of the terminal which are received from a predetermined network through a media independent handover (MIH) layer;
- forming a tunnel connected to the predetermined network by using the handover request information and the tunnel setup information; and
- activating the tunnel and receiving data from the predetermined network if a tunnel activation request signal is received from the predetermined network through the MIH layer.

18. The method of claim 17, wherein the handover request information includes resource information that is requested to perform the handover by the terminal.

19. The method of claim 17, wherein the tunnel setup information includes a network address of the predetermined network and the network address of the target network which is created by the terminal.

20. The method of claim 17, wherein the forming of the tunnel comprises:
- determining whether to support the handover of the terminal by using the handover request information;
- the MIH layer transmitting the tunnel setup request to a network layer if it is determined that the handover of the terminal is supported; and
- the network layer forming the tunnel connected to the predetermined network by using the tunnel setup information.

21. The method of claim 20, wherein the forming of the tunnel comprises:
- the network layer checking soleness of a network address of the target network which is included in the tunnel setup information; and
- forming the tunnel connected to the predetermined network by using the network address if the network address is usable.

22. The method of claim 21, further comprising:
- creating a new network address if the network address is not usable; and
- forming the tunnel connected to the predetermined network by using the new network address.

23. The method of claim 20, further comprising transmitting handover support information on the terminal, tunnel formation information, and a network address to the MIH layer of the predetermined network through the MIH layer.

24. The method of claim 17, further comprising:
- temporarily storing data that is received from the predetermined network through the tunnel; and
- forwarding the temporarily stored data to the terminal if a handover completion signal is received form the terminal.

25. A method of supporting handover of a terminal by a serving network in a wireless communication system, the method comprising:
- checking handover request information and tunnel setup information from a handover initiation message that is received from the terminal through a media independent handover (MIH) layer;
- forming tunnels with available networks to which the handover of the terminal is performed through the MIH layer by using the tunnel setup information;
- transmitting tunnel formation information to the terminal through the MIH layer;
- activating a tunnel connected to a target network if a tunnel activation request signal for performing the handover of the terminal is received from the target network through the MIH layer; and
- forwarding data to be forwarded to the terminal, to the target network through the tunnel.

26. The method of claim 25, wherein the handover request information includes information on the available networks to which the handover of the terminal is performed and resource information that is requested to each network when the handover is performed.

27. The method of claim 25, wherein the tunnel setup information includes a network address of the serving network and network addresses of the available networks to which the handover of the terminal is performed.

28. The method of claim 25, wherein the forming of the tunnels with the available networks comprises:
transmitting the handover request information and the tunnel setup information of the terminal to MIH layers of the available networks through the MIH layer;
checking tunnel state information that is received from the MIH layers of the available networks; and
forming the tunnels with the available networks by using the tunnel state information.

29. The method of claim 28, further comprising:
the MIH layer transmitting a tunnel preparation signal to a network layer; and
the network layer receiving the tunnel preparation signal and preparing to form the tunnels with the available networks.

30. The method of claim 28, further comprising:
checking handover support information on the terminal which is received from the MIH layers of the available networks;
checking available networks which support the handover of the terminal from among the available networks, by using the handover support information on the terminal;
forming the tunnels with the available networks which support the handover of the terminal; and
transmitting the tunnel formation information and the handover support information to the terminal through the MIH layer.

31. A method of supporting handover of a terminal by a target network in a wireless communication system, the method comprising:
checking handover request information and tunnel setup information of the terminal which are received from a predetermined network through a media independent handover (MIH) layer;
forming a tunnel connected to the predetermined network by using the handover request information and the tunnel setup information;
transmitting a tunnel activation request signal to the predetermined network if the tunnel activation request signal is received from the terminal through the MIH layer; and
activating the tunnel and receiving data from the predetermined network.

32. The method of claim 31, wherein the handover request information includes resource information that is requested to perform the handover by the terminal.

33. The method of claim 31, wherein the tunnel setup information includes a network address of the predetermined network and the network address of the target network which is created by the terminal.

34. The method of claim 31, wherein the forming of the tunnel comprises:
determining whether to support the handover of the terminal by using the handover request information;
the MIH layer transmitting the tunnel setup request to a network layer if it is determined that the handover of the terminal is supported; and
the network layer forming the tunnel connected to the predetermined network by using the tunnel setup information.

35. The method of claim 34, wherein the forming of the tunnel comprises:
the network layer checking soleness of a network address of the target network which is included in the tunnel setup information; and
forming the tunnel connected to the predetermined network by using the network address if the network address is usable.

36. The method of claim 34, further comprising:
creating a new network address if the network address is not usable; and
forming the tunnel connected to the predetermined network by using the new network address.

37. The method of claim 20, further comprising transmitting handover support information on the terminal, tunnel formation information, and a network address to the MIH layer of the predetermined network through the MIH layer.

38. The method of claim 31, further comprising:
temporarily storing data that is received from the predetermined network through the tunnel; and
forwarding the temporarily stored data to the terminal if a handover completion signal is received form the terminal.

39. A wireless communication system for supporting handover, the wireless communication system comprising:
a terminal;
a serving network; and
a target network,
wherein the terminal controls tunnel setup between the serving network and available networks through a media independent handover (MIH) layer, activates a tunnel between the serving network and the target network to which the handover is performed from among the available networks, and performs the handover to the target network,
wherein the serving network sets up tunnels connected to the available networks in accordance with a signal that is received from the terminal through the MIH layer, activates a tunnel connected to the target network, and forwards data to be forwarded to the terminal, to the target network through the tunnel, and
wherein the target network sets up the tunnel connected to the serving network in accordance with a signal that is received from the serving network through the MIH layer, and forwards the data that is received from the serving network through the tunnel, to the terminal after the handover is performed.

* * * * *

UNITED STATES PATENT AND TRADEMARK OFFICE
CERTIFICATE OF CORRECTION

PATENT NO. : 8,185,113 B2  
APPLICATION NO. : 12/115577  
DATED : May 22, 2012  
INVENTOR(S) : Suh et al.

Page 1 of 1

It is certified that error appears in the above-identified patent and that said Letters Patent is hereby corrected as shown below:

Column 24, Claim 24, line 46 delete "form" and insert -- from --, therefor.

Column 26, Claim 38, line 32 delete "form" and insert -- from --, therefor.

Signed and Sealed this
Seventh Day of August, 2012

David J. Kappos
*Director of the United States Patent and Trademark Office*